US008234435B2

(12) United States Patent
Yoshida et al.

(10) Patent No.: US 8,234,435 B2
(45) Date of Patent: Jul. 31, 2012

(54) RELAY DEVICE

(75) Inventors: Atsushi Yoshida, Osaka (JP); Takao Yamaguchi, Osaka (JP); Tomoki Ishii, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/305,832

(22) Filed: Nov. 29, 2011

(65) Prior Publication Data

US 2012/0072635 A1 Mar. 22, 2012

Related U.S. Application Data

(63) Continuation of application No. PCT/JP2011/003020, filed on May 31, 2011.

(30) Foreign Application Priority Data

Sep. 3, 2010 (JP) .................................. 2010-197604

(51) Int. Cl.
*G06F 13/36* (2006.01)
(52) U.S. Cl. ..................... 710/311; 370/395.42; 370/400
(58) Field of Classification Search .................. 710/311, 710/305–306, 309; 370/395.42, 400–402, 370/412, 419, 395.4
See application file for complete search history.

(56) References Cited

U.S. PATENT DOCUMENTS

| 6,674,720 | B1 | 1/2004 | Passint et al. |
| 2006/0203825 | A1 | 9/2006 | Beigne et al. |
| 2010/0172366 | A1 | 7/2010 | Inoue et al. |
| 2011/0026405 | A1 | 2/2011 | Takagi et al. |

FOREIGN PATENT DOCUMENTS

| JP | 2006-254450 A | 9/2006 |
| WO | 2007/099644 A1 | 9/2009 |
| WO | 2009/133918 A1 | 11/2009 |

OTHER PUBLICATIONS

International Search Report for corresponding International Application No. PCT/JP2011/003020 mailed Jul. 5, 2011.
Form PCT/ISA/237 for corresponding International Application No. PCT/JP2011/003020 dated Jul. 5, 2011.
E. Bolotin et al., "QNoC: QoS architecture and design process for network on chip", Journal of Systems Architecture, vol. 50, No. 2-3, Feb. 2004, pp. 105(1)-128(24).
H. Matsutani et al., "Adding Slow-Silent Virtual Channels for Low-Power On-Chip Networks", Proceedings of the Second ACM/IEEE International Symposium on Networks-on-Chip, IEEE, Apr. 2008, pp. 23-32.
W. Dally et al., "Principles and Practices of Interconnection Networks", Morgan Kaufmann Publishers, ISBN-13:978-0-12-200751-4, 2004, pp. 363-376.

*Primary Examiner* — Clifford Knoll
(74) *Attorney, Agent, or Firm* — Renner, Otto, Boisselle & Sklar, LLP

(57) ABSTRACT

A relay device includes: an input buffer for receiving data units, each of which includes a header, to which multiple pieces of destination information have been added, and data associated with the header; multiple virtual channels for storing data units, each of the multiple virtual channels storing a data unit in accordance with the destination information; a destination comparing section for determining the order of allocation of virtual channels at a relay device on the receiving end with respect to the data units that are stored on the multiple virtual channels by seeing if their destinations are the same; and an output section for outputting the stored data units preferentially through one of the virtual channels that has already allocated at the relay device on the receiving end.

14 Claims, 31 Drawing Sheets

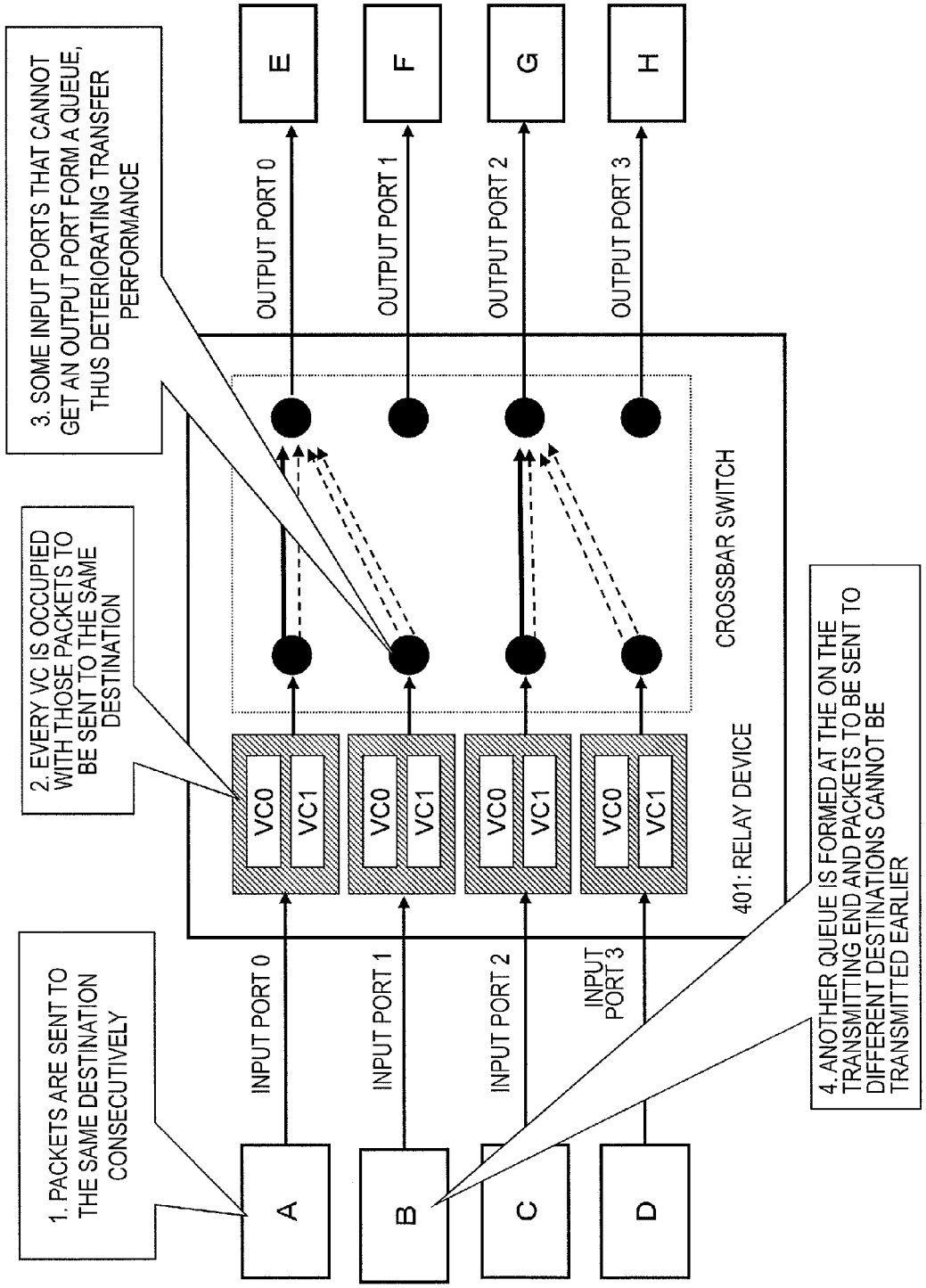

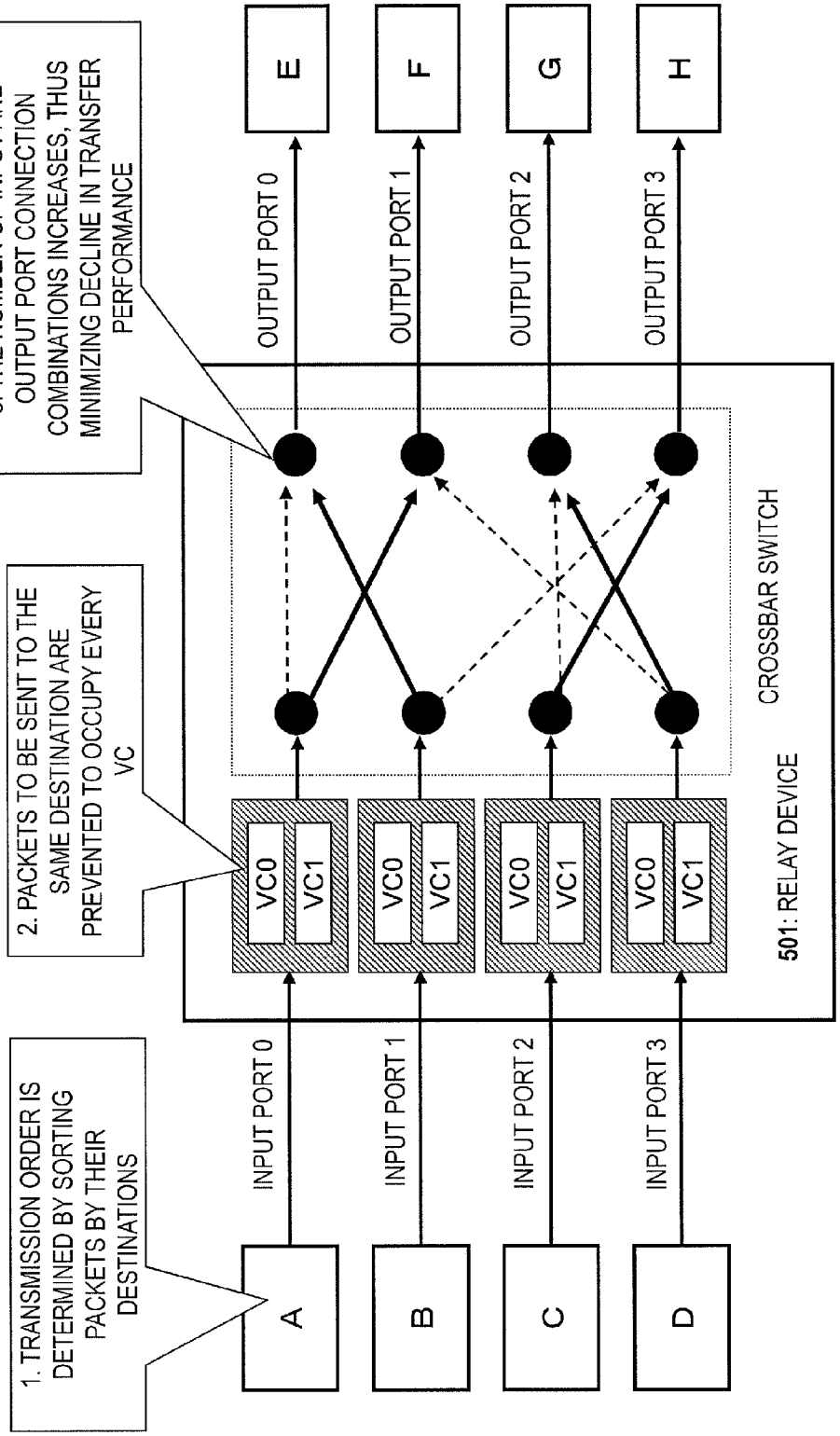

| INPUT PORT NUMBER | VIRTUAL CHANNEL NUMBER | DESTINATION ADDRESS | TIME INFORMATION (TRANSMISSION TIME) | OUTPUT PORT NUMBER | OUTPUT CHANNEL NUMBER |
|---|---|---|---|---|---|
| 0 | 0 | — | — | TBD | TBD |
|   | 1 | — | — | TBD | TBD |
|   | 2 | — | — | TBD | TBD |
|   | 3 | — | — | TBD | TBD |

1301

| INPUT PORT NUMBER | VIRTUAL CHANNEL NUMBER | DESTINATION ADDRESS | TIME INFORMATION (TRANSMISSION TIME) | OUTPUT PORT NUMBER | OUTPUT CHANNEL NUMBER |
|---|---|---|---|---|---|
| 0 | 0 | 000 | 0...020 | TBD | TBD |
|   | 1 | — | — | TBD | TBD |
|   | 2 | — | — | TBD | TBD |
|   | 3 | — | — | TBD | TBD |

1301

| INPUT PORT NUMBER | VIRTUAL CHANNEL NUMBER | DESTINATION ADDRESS | TIME INFORMATION (TRANSMISSION TIME) | OUTPUT PORT NUMBER | OUTPUT CHANNEL NUMBER |
|---|---|---|---|---|---|
| 0 | 0 | 000 | 0...020 | 0 | TBD |
|   | 1 | — | — | TBD | TBD |
|   | 2 | — | — | TBD | TBD |
|   | 3 | — | — | TBD | TBD |

1301

| INPUT PORT NUMBER | VIRTUAL CHANNEL NUMBER | DESTINATION ADDRESS | TIME INFORMATION (TRANSMISSION TIME) | OUTPUT PORT NUMBER | OUTPUT CHANNEL NUMBER |
|---|---|---|---|---|---|
| 0 | 0 | 000 | 0...020 | 0 | 0 |
|  | 1 | — | — | TBD | TBD |
|  | 2 | — | — | TBD | TBD |
|  | 3 | — | — | TBD | TBD |

1301

| DEFINITION OF DESTINATION | (NUMBER OF) DESTINATIONS FOR RELAY DEVICE R1 |
|---|---|
| RECEPTION NODE | MEMORIES 0 THROUGH 8 (EIGHT IN TOTAL) |
| RELAY DEVICES TWO HOPS AWAY FROM THE CURRENT ONE | R8, R9, R10 AND R11 (FOUR IN TOTAL) |
| RELAY DEVICES ONE HOP WAY FROM THE CURRENT ONE | R5 AND R7 (TWO IN TOTAL) |

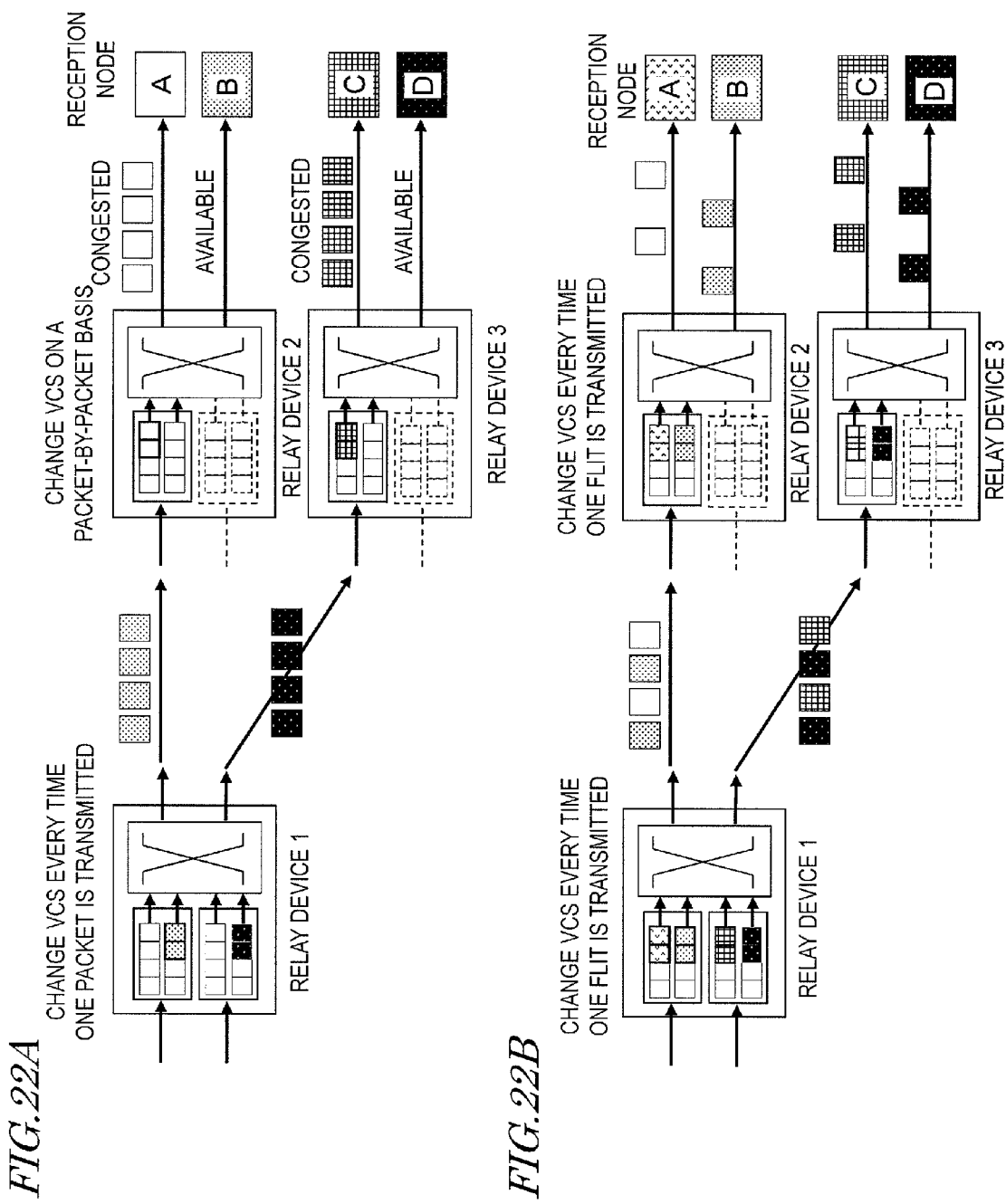

*FIG.23*

|  | CHANGE VCS EVERY TIME ONE PACKET IS TRANSMITTED | CHANGE VCS EVERY TIME ONE FLIT IS TRANSMITTED |
|---|---|---|
| BUS USE EFFICIENCY IN ENTIRE NoC | LOW | HIGH |
| SWITCH TURNING FREQUENCY | LOW | HIGH |

RELAY DEVICE

This is a continuation of International Application No. PCT/JP2011/003020, with an international filing date of May 31, 2011, which claims priority of Japanese Patent Application No. 2010-197604, filed on Sep. 3, 2010, the contents of which are hereby incorporated by reference.

BACKGROUND OF THE INVENTION

1. Field of the Invention

The present invention relates to a technology for arranging a transmission schedule for a number of traffics that are flowing through multiple relay devices, each of which connects a plurality of buses together, in a semiconductor integrated circuit with distributed buses.

2. Description of the Related Art

FIG. 1(A) illustrates an example of a centralized bus control. In a conventional integrated circuit that performs such a centralized bus control, a number of bus masters BMs and a memory MEM are usually connected together with a single bus, and accesses to the memory by the respective bus masters are arbitrated by an arbiter. However, as the functionality of an integrated circuit has been further improved and as the number of cores in an integrated circuit has been further increased these days, the scale of the circuit has become even larger and the flow of traffics through the bus has gotten even more complicated. As a result, it has become increasingly difficult to design an integrated circuit by such a centralized bus control.

Meanwhile, semiconductor integrated circuits with distributed buses have been developed one after another lately by introducing parallel computerized connection technologies and network control technologies such as ATM (asynchronous transfer mode). FIG. 1(B) illustrates an example of a distributed bus control. In a semiconductor integrated circuit with distributed buses, a number of relay devices R are connected together with multiple buses. Recently, people have been working on a so-called "Network on Chip (NoC)" in which the traffics in a large-scale integrated circuit are transmitted through a number of buses by adopting the distributed buses such as the one shown in FIG. 1(B).

FIG. 2 illustrates generally a basic configuration for a relay device for use in the NoC, parallel computers, ATM network, and so on. In such a relay device, traffic data is divided into a number of small units such as packets or cells, each of which is transmitted to its destination node. The data that has been sent to the relay device is temporarily retained in buffers.

Also, in order to transmit a number of different packets in parallel with each other through each input port, a virtual channel (which is sometimes called a "VC"), in which multiple buffers are connected in parallel with each other, is provided for each input port. That is to say, each virtual channel substantively consists of multiple buffer memories for a relay device. In this case, a number of buffers may actually be physically arranged for and with respect to each input port. Alternatively, a virtual channel may also be provided even by managing the data on a single buffer memory as if there were multiple buffers there.

In addition, a crossbar switch is further arranged in order to determine an exclusive connection between each input port and its associated output port. The exclusive connection between an input port and its associated output port via the crossbar switch is also determined by an arbiter.

By getting the crossbar switch turned by the arbiter in this manner, the relay device relays the data that is retained in the buffers to a destination.

Next, it will be described how to change the connection between an input port of a relay device and its associated output port. Each input port of a relay device and its associated output port are connected exclusively with each other via the crossbar switch. In this description, the "exclusive connection" refers to a situation where when multiple input ports and multiple output ports need to be connected at a time, not more than one input port is connected to one output port.

FIG. 3A illustrates how a connection request (transmission request) with respect to a particular output port is issued by an input port in a relay device. In this example, two virtual channels are provided for each input port. Virtual channels #0 and #1 of input port #0 request sending a packet to output ports #0 and #2, respectively. Virtual channels #0 and #1 of input port #1 request sending a packet to output ports #0 and #1, respectively. Virtual channels #0 and #1 of input port #2 request sending a packet to output ports #2 and #3, respectively. And virtual channels #0 and #1 of input port #3 request sending a packet to output ports #0 and #2, respectively.

The arbiter chooses a combination in which input and output ports are connected exclusively together from a number of connection requests from multiple input channels to the same output channel and turns the crossbar switch in accordance with its choice. As for the connection requests shown in FIG. 3A, the exclusive input and output port combinations chosen by the arbiter may be a combination of input port #0 and output port #2, a combination of input port #1 and output port #1, a combination of input port #2 and output port #3, and a combination of input port #3 and output port #0 as shown in FIG. 3B.

The greater the number of input and output port combinations that can be connected together simultaneously, the greater the number of packets that can be sent simultaneously through such exclusive connections between the input and output ports via the crossbar switch.

For that reason, parallel computers and ATM generally adopt a "wavefront allocator" method for searching all possible input and output port combinations for the best combination available or a "parallel iterative matching" method in which partial optimum solutions are obtained independently of each other on the input port and output port sides and iteratively, thereby attempting to increase the accuracy (see "Principles and Practices of Interconnection Networks", W. Dally and B. Towles, Morgan Kaufmann Publishers (hereinafter referred to as "Non-Patent Document No. 1"), for example).

Meanwhile, a so-called "age-based" method has been proposed in U.S. Pat. No. 6,674,720. According to that method, if multiple virtual channels request connection to the same output port, a value called "age" is defined based on the length of the time that passed since a packet was transmitted and the number of hops that the packet has made in order to maintain the order in which a number of packets have been sent and to minimize an increase in time delay between the packets or their difference. And according to the "age-based" method, a packet with the maximum (or minimum) age is supposed to be sent first.

On the other hand, in an NoC, a number of relay devices need to be arranged on an integrated circuit, and therefore, the number or the size of virtual channels that can be processed by each relay device is smaller than that of a parallel computer or ATM network. According to the NoC, the size of one virtual channel is typically as large as one packet.

For that reason, according to the NoC, only a limited number of virtual channels should be used as efficiently as possible within a shorter time delay. For that purpose, it is important to control the transmission schedule so that the number of connections between input and output ports is maximized in not only each relay device but also the relay device on the receiving end as well.

On top of that, various constraints are imposed on those relay devices on the NoC in terms of the scale of the integrated circuit, the permissible time delay, and power dissipation. For that reason, it is not a good idea to apply an algorithm such as the Wavefront Allocator for searching a huge number of combinations for the best one or algorithm such as Parallel Matching Interater that requires iterative processing to each of those relay devices on the NoC as it is. If an ordinary relay device scheme that is currently used in parallel computers or ATM were applied as it is to a relay device on the NoC, then the circuit size, processing time, and power dissipation of an arbiter would also increase so much as to cause a decline in the performance of the NoC or a significant increase in processing time.

Hereinafter, this problem will be described in further detail.

FIG. 4 illustrates a specific example of the problem to be overcome by the present invention.

The relay device 401 shown in FIG. 4 is connected to four relay devices A, B, C and D, from which packets are sent out, through four input ports and receives those packets that have been sent from them. The relay device 401 is also connected to four other relay devices E, F, G and H, to which those packets should be sent, through four output ports, and forwards those packets to them.

Each of those input ports of the relay device 401 has two virtual channels so that each input port can issue transmission requests to at most two output ports.

However, if multiple relay devices on the transmitting end attempt to send packets to the same destination consecutively (Step 1) and if those packets are simply relayed right in their order of transmission as in the Age-Based method, then every virtual channel VC at each input port will be occupied with those packets to be sent to the same destination (Step 2). In that case, as multiple virtual channels VC attempt to get the same output port, some input port can get that output port successfully but another input port will fail to get it. And the latter input port cannot send the packets even if there is another output port available, thus deteriorating the transfer performance of the relay device (Step 3). Furthermore, once such a queue has been formed at the relay device 401, another queue will be formed at the relay devices on the transmitting end, too. In such a situation, even if there are packets that should be sent to different destinations from those of the packets in the queue, the former packets cannot be sent earlier than the latter packets in the relay device 401 (Step 4).

For example, in FIG. 4, suppose a situation where as the relay device 401 has received consecutively those packets to be sent to a few particular destinations from the relay devices on the transmitting end, packets to be sent to output port #0 are stored on every virtual channel of input ports #0 and #1 of the relay device 401 and packets to be sent to output port #2 are stored on every virtual channel of input ports #2 and #3 of the relay device 401. In that case, if every virtual channel issues a packet transmission request with respect to its output port, virtual channel #0 of input port #0 may get output port #0 and virtual channel #0 of input port #2 may get output port #2. Then, even though output ports #1 and #3 are still available, input ports #1 and #3 have no packets to be sent to those output ports, and therefore, will have no choice but to join the queue.

Also, even if any packet to be sent to output port #1 or #3 is stored on the relay device B or D on the transmitting end, that packet cannot be sent earlier than those packets that form the queue at the virtual channels of input ports #1 and #3 in the relay device 401.

If every virtual channel of each input port is occupied with particular packets in this manner, the transfer performance of the relay device will decline.

In parallel computers and ATM, however, the constraints on the number or size of virtual channels and on the time delay are less strict. That is why even if packets to be sent to the same destination have been received consecutively, such an unwanted situation where every virtual channel in the relay device is occupied with those packets to be sent to the same destination is less likely to arise. Furthermore, even if every virtual channel is occupied with those packets to be sent to the same destination, the permissible time delay of a parallel computer or ATM is still longer than the duration of such an occupied state, thus affecting the transfer performance to a lesser degree.

In the NoC, on the other hand, since relay devices are implemented on a semiconductor circuit, strict constraints are imposed on the number or size of virtual channels and on the time delay, and the number of virtual channels available in the relay device often gets short. As a result, the overall transfer performance of the NoC is seriously affected in such a situation.

SUMMARY OF THE INVENTION

It is therefore an object of the present invention to provide a relay device that can improve the overall transfer performance of an NoC by minimizing a decline in the packet transfer performance such as the throughput and the time delay.

A relay device according to the present invention includes: an input buffer for receiving data units, each of which includes a header, to which multiple pieces of destination information have been added, and data associated with the header; multiple virtual channels for storing data units, each of the multiple virtual channels storing a data unit in accordance with the destination information; a destination comparing section for determining the order of allocation of virtual channels at a relay device on the receiving end with respect to the data units that are stored on the multiple virtual channels by seeing if their destinations are the same; and an output section for outputting the stored data units preferentially through one of the virtual channels that has already allocated at the relay device on the receiving end.

The destination comparing section may sort the data units by the destination and may determine the order of allocation so that if any data is going to be sent to a destination to which no virtual channel has been allocated yet at the relay device on the receiving end, some virtual channel is allocated to that data preferentially at the relay device on the receiving end.

If multiple data units are going to be sent to the same destination, the destination comparing section may determine the order of allocation of the virtual channels to those data units at the relay device on the receiving end by reference to time information included in the header.

By using, as the time information, the amount of time that has passed since data was transmitted, the destination comparing section may allocate one of the virtual channels at the relay device on the receiving end preferentially to data that was transmitted the longest time ago.

By using, as the time information, a deadline by which data should arrive at its destination, the destination comparing section may allocate one of the virtual channels at the relay device on the receiving end preferentially to data that has the shortest time left until its deadline.

The relay device may further include multiple input ports, each of which receives data to be sent to a specified destination. The output section may include: multiple output ports, each of which outputs data; and a crossbar switch for outputting the data through the output ports according to the destinations of the data that are stored on the virtual channels by connecting one of the virtual channels that stores data, of which the time-information-based priority is higher than any other data, to one of the output ports that is connected to a bus leading to the destination of that data with the highest priority.

The longer the amount of time that passed since data stored on the virtual channel was transmitted, the higher its time-information-based priority may be.

The shorter the amount of time left until a deadline, by which data stored on the virtual channel should arrive at its destination, the higher its time-information-based priority may be.

Each packet of the data is comprised of a number of flits and the data may be transferred on a flit basis over the bus. The relay device may further include a load measuring section for measuring the load of data that passes through the relay device itself. If the load that has been measured by the load measuring section is greater than a predetermined threshold value, the crossbar switch may change connections between the virtual channels and the output ports every time one flit is transmitted. But if the load is equal to or smaller than the threshold value, the crossbar switch may change connections between the virtual channels and the output ports every time a number of flits that form one packet are transmitted.

The load measuring section may measure the number of flits that are stored on the virtual channels in its relay device as the load of the data that passes through the relay device.

Every time one flit is transmitted, the crossbar switch may change connections between the virtual channels and the output ports.

The relay device may further include: a transmission route analyzing section for finding transmission routes, respective parts of which are shared by multiple packets to be sent to mutually different destinations; and an output channel selecting section for selecting, by reference to the time information and on a virtual channel's destination basis, an output channel to be connected to the virtual channel that stores the data with the highest time-information-based priority. By adopting the transmission routes that have been found by the transmission route analyzing section, the output channel selecting section allocates the virtual channels at the relay devices on the receiving end sequentially so that one of the relay devices that stores a packet that will arrive at its destination with the transmission route sharing minimized is given the virtual channel earlier than any other relay device.

The destination comparing section may determine the order of allocation of the virtual channels at the relay devices on the receiving end to the data units that are stored on the multiple virtual channels by seeing if the same relay device is to pass on the routes leading to the destinations.

Another relay device according to the present invention includes multiple virtual channels for storing data units, each of which includes a header, to which deadline information indicating a deadline by which data should arrive at its specified destination has been added, and data associated with the header, and a destination comparing section for determining the order of allocation of virtual channels at a relay device on the receiving end with respect to the data units that are stored on the multiple virtual channels by reference to the time specified by the time information. Once one of the virtual channels at the relay device on the receiving end has been allocated, the virtual channel begins to output the data unit stored and get that data unit relayed through an integrated circuit.

According to the present invention, by allocating virtual channels more uniformly to packets that should be sent to multiple different destinations without increasing the size or number of virtual channels at the relay device, it is possible to prevent packets to be sent to the same destination from occupying every virtual channel in the relay device. As a result, each relay device can send packets to a greater number of destinations at the same time, and therefore, it is possible to avoid an unwanted situation where data cannot flow easily through the next relay device. Consequently, the overall transfer performance (such as the throughput, time delay and jitter) of the NoC can be improved.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 4 illustrates a specific example of the problem to be overcome by the present invention.

FIG. 5 illustrates generally how the relay device 501 of the present invention works.

FIGS. 22A and 22B illustrate how when packets are going to be transmitted through three relay devices #1, #2 and #3 to four reception nodes A, B, C and D, those relay devices control the transmission schedule and in what order flits that pass through the respective buses need to be transmitted.

FIG. 23 shows in comparison how the bus use efficiency and the crossbar switch turning frequency change depending on whether the packet transmission schedule is controlled on a packet basis or on a flit basis.

DETAILED DESCRIPTION OF PREFERRED EMBODIMENTS

Hereinafter, the operating principle and preferred embodiments of a relay device according to the present invention will be described with reference to the accompanying drawings.

FIG. 5 illustrates generally how the relay device 501 of the present invention works.

In a relay device for use in parallel computers, ATM and so on, a packet sending schedule is arranged mainly for the purpose of sending as many packets on virtual channels as possible. In such an operating environment, a fewer constrains on the number or size of virtual channels or time delay are imposed compared to the NoC, and therefore, nobody has to imagine that every virtual channel at a relay device on the receiving end might be occupied with packets to be sent to the same destination. In fact, the virtual channel allocation control has never been carried out so far so as to store packets to be sent to multiple different destinations on those virtual channels.

On the other hand, the present invention provides a relay device that is supposed to be used in a telecommunications environment such as an NoC on which various constrains are imposed in terms of the number or size of the virtual channels and the time delay. Specifically, if there are a number of packets to be sent to multiple different destinations in the same relay device, the relay device of the present invention does not simply relay those packets in their order of transmission but arranges the packet sending schedule so that those packets to be sent to multiple different destinations are stored as uniformly as possible on the virtual channels at the relay device on the receiving end.

To achieve this object, the relay device takes the following steps as shown in FIG. 5. Specifically, in Step 1, relay devices on the transmitting end sort packets by their destinations and send those packets so that those packets to be sent to multiple different destinations are stored uniformly on the virtual channels at the relay device 501. In this manner, in Step 2, it is possible to avoid an unwanted situation where packets to be sent to the same destination occupy every virtual channel VC. As a result, in Step 3, the number of exclusive input and output port combinations increases and the queue can be shortened significantly, thus eventually minimizing the decline in transfer performance.

Hereinafter, specific preferred embodiments of a relay device according to the present invention will be described.

Embodiment 1

Figure 1:
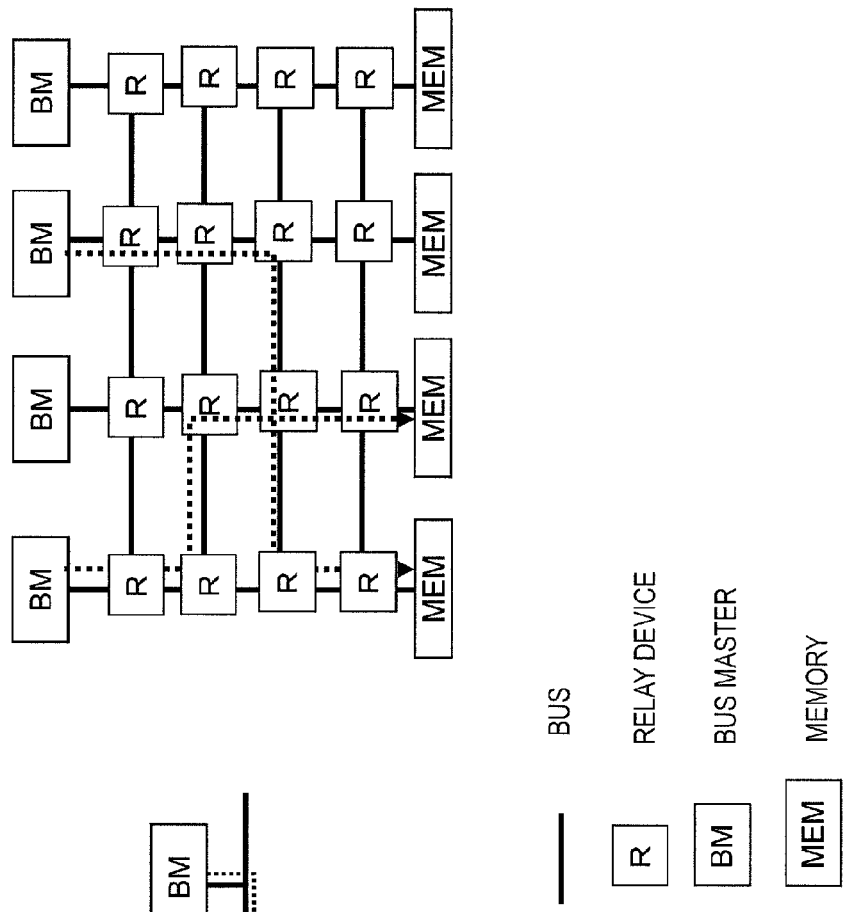
FIG. 1(A) illustrates an example of a centralized bus control and FIG. 1(B) illustrates an example of a distributed bus control.
Figure 2:
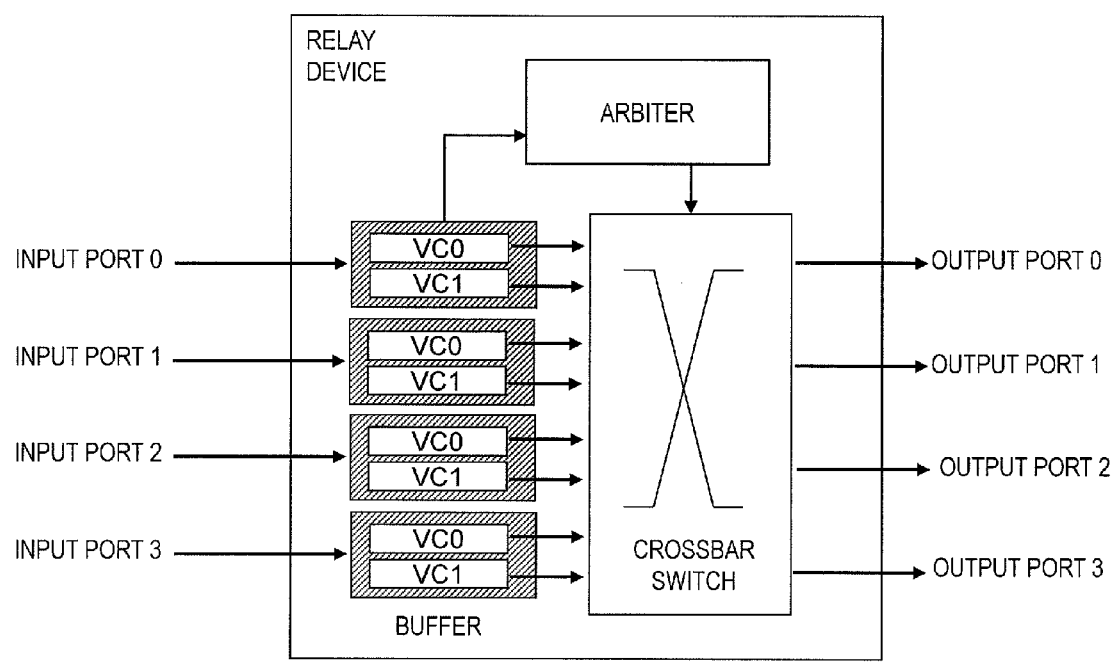
FIG. 2 illustrates generally a basic configuration for a relay device.
Figure 3A:
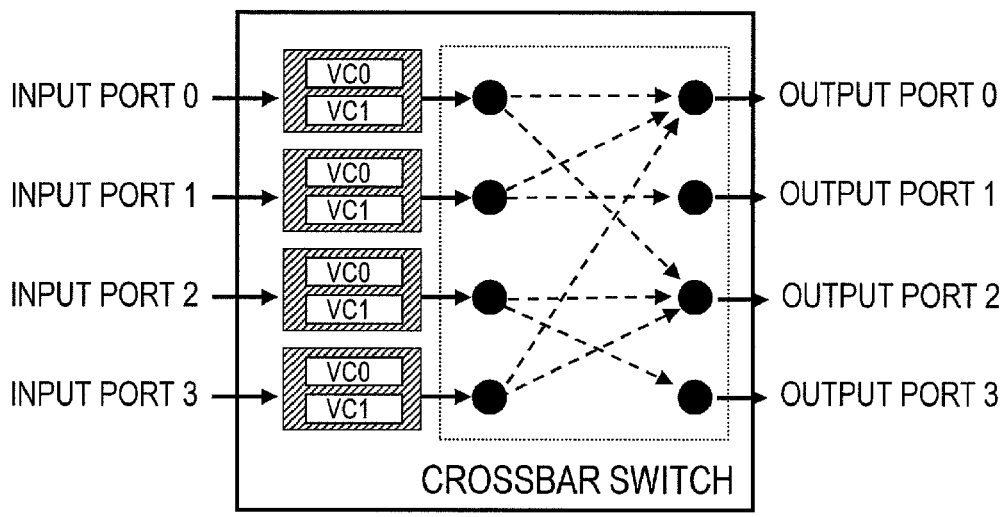
FIG. 3A illustrates how a connection request (transmission request) with respect to a particular output port is issued by an input port in a relay device.
Figure 3B:
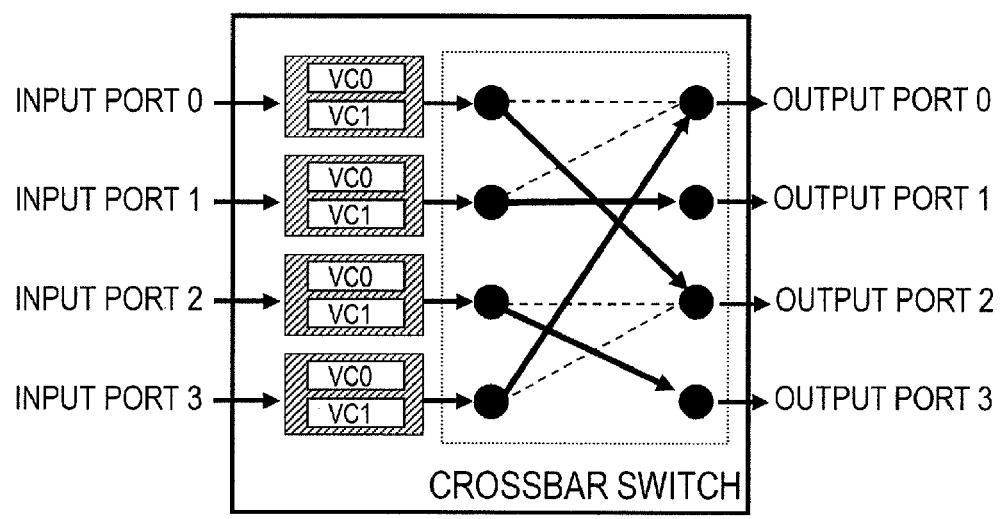
FIG. 3B illustrates an exemplary exclusive connection combination of input and output ports.
Figure 6:
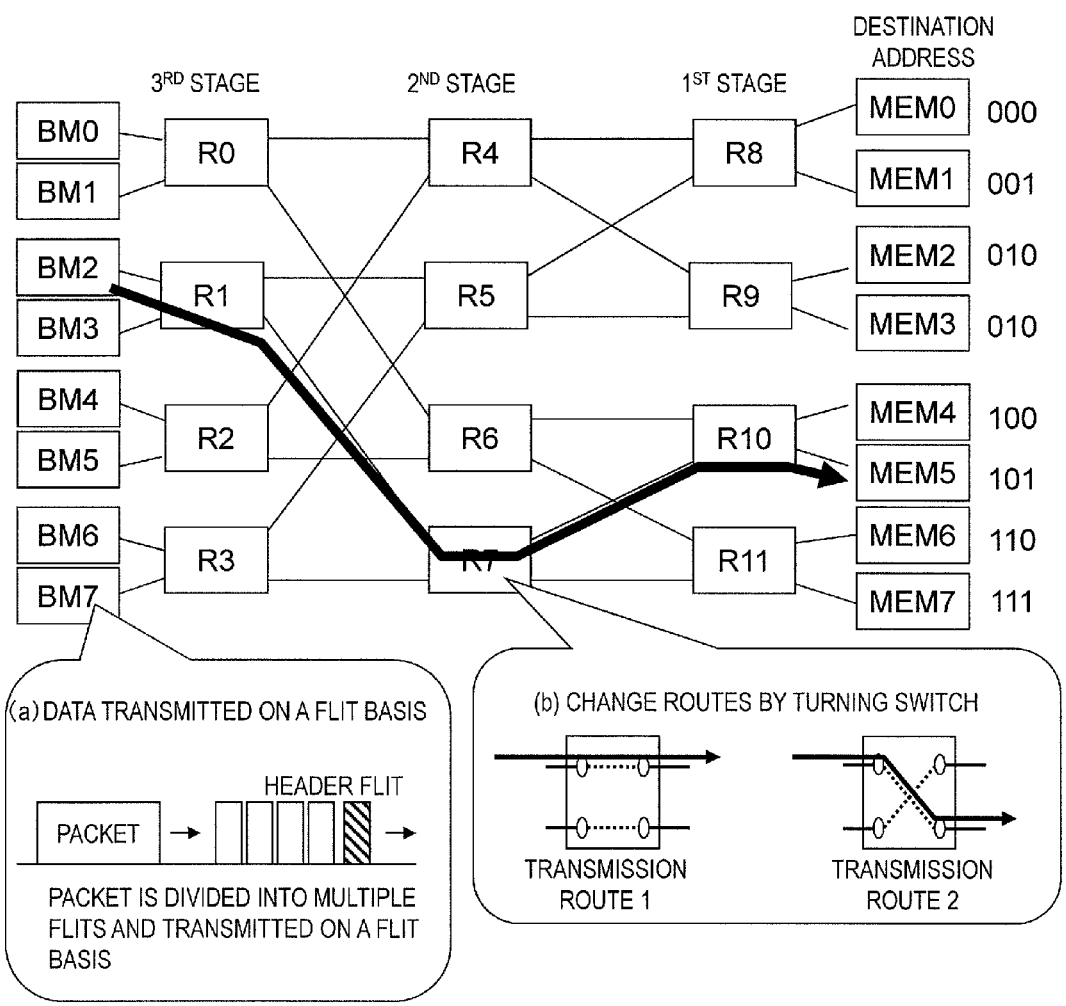
FIG. 6 illustrates an arrangement of distributed buses, which is supposed to be used in a first specific preferred embodiment of the present invention.

FIG. 6 illustrates an arrangement of distributed buses, which is supposed to be used in a first specific preferred embodiment of the present invention.

In this Preferred Embodiment, an Architecture in which multiple bus masters BMs as transmission nodes and multiple memories as reception nodes are connected together via multiple relay devices (and which is called a "multistage interconnection network (MIN)") will be described as an example. Each of those relay devices is supposed to have two inputs and two outputs.

More specifically, in the circuit illustrated in FIG. 6, eight bus masters BM0 through BM7, twelve relay devices R0 through R11, and eight memories #0 through #7 are connected together with buses.

Those twelve relay devices are classified into three groups, each of which consists of four relay devices. Specifically, one of three is a group consisting of R0, R1, R2 and R3 that are connected to the eight bus masters, another one is a group consisting of R8, R9, R10 and R11 that are connected to the eight memories, and the other is a group consisting of R4, R5, R6 and R7 that interconnect the relay devices connected to the bus masters and the relay devices connected to the memories together.

Each of those relay devices that form parts of this multistage interconnection network includes a crossbar switch with two inputs and two outputs. By changing the input and output combinations with the switch turned as shown in portion (b) of FIG. 6, the traffic flowing can pass selectively through one of the two transmission routes. It should be noted that if the destinations cannot be reached unless both of these two transmission routes are taken, then the relay device can output the two traffics through both of the two transmission routes at the same time.

In this multistage interconnection network, by turning the switch at each relay device, one or more transmission routes can always be formed between every bus master and every memory.

In general, to connect every one of N bus masters and every one of M memories together with crossbar switches, N×M switches are needed. In that case, the greater the number of bus masters or memories, the more steeply the number of switches needed rises. On the other hand, such a multistage interconnection network (MIN) is characterized by connecting crossbar switches with a small number of inputs and outputs in a hierarchical pattern so that the connection between the bus masters and memories can be changed with a much smaller number of switches.

Although such a multistage interconnection network is supposed to be used in this preferred embodiment, this is only an example of the present invention. Thus, the present invention is naturally applicable to even an integrated circuit that has a different topology. Also, according to this preferred embodiment, data is supposed to be transferred from a bus master to a memory by packet exchange method by way of multiple relay devices.

As shown in portion (a) of FIG. 6, each packet is divided into multiple units called "flits" of a size that is small enough to send it in one cycle through the bus and transmitted to an adjacent relay device.

Figure 7:
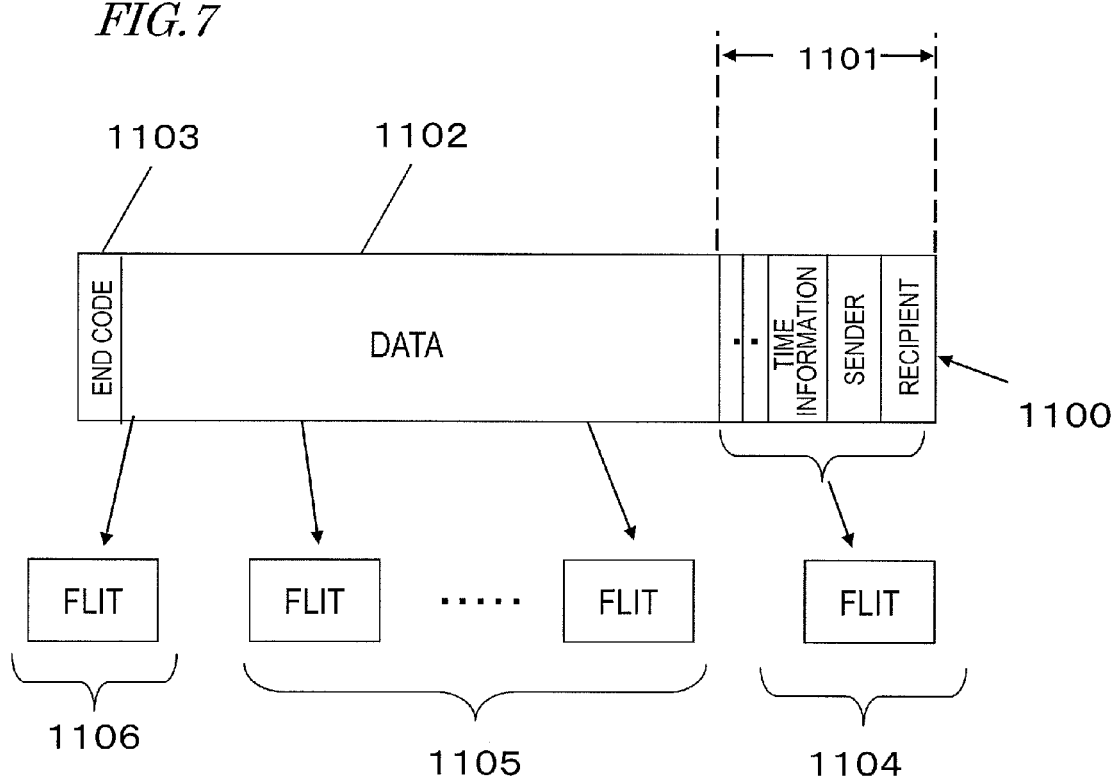
FIG. 7 illustrates an exemplary transmission format for a packet 1100 and how the packet 1000 may be divided into multiple flits.

FIG. 7 illustrates an exemplary transmission format for a packet 1100 and how the packet 1000 may be divided into multiple flits.

The packet 1100 includes a header field 1101, a data field 1102, and a control code field 1103.

In the header field 1101, described are the receiving end's address, the transmitting end's address, information about the amount of time that has passed since the packet was transmitted (which will be referred to herein as "time information"), for example. The time information may be described in any form as long as the amount of time that has passed since one packet was transmitted to a bus master can be compared to another packet's. For example, the time when the packet was transmitted to a bus master may be indicated as it is. The amount of time that has passed since the packet was transmitted may be shown as described above. Or the number relay devices that have been hopped so far may be described as well.

In the data field 1102, on the other hand, video data or audio data may be described, for example. In the control code field 1103, the end code of a predetermined packet 1100 may be described, for example.

The processing of relaying the packet 1100 and the processing of receiving the packet 1100 at the receiving end are performed based on the receiving end's address and the transmitting end's address among the data stored in the header field 1101.

Each bus master on the transmitting end transmits the packet 1100 after having divided it into smaller packet units called "flits". In this case, one flit is data that can be transmitted through the bus in one cycle and its size is determined by the width of the bus. Among those flits obtained by dividing one packet 1100, the flit to be transmitted first is called a "header flit" 1104, to which flag information indicating that this flit is located at the beginning of a packet and information about the receiving end's address of the packet are added.

It should be noted that the address information specifying the receiving end is not stored in any of the flits that follow the header flit 1104. This is because those flits that follow the header flit 1104 are supposed to be sent to the same destination as the header flit 1104. When the destination is determined by the header flit 1104 and when an output buffer to which the flits in that traffic are output is determined, the flits that follow the header flit 1104 are transmitted to the destination specified by the header flit 1104 by using the same output buffer as what is used by the header flit 1104.

On the other hand, the last flit of one packet is called a "tail flit" 1106, to which added is flag information indicating that this is the last one of the flits that form one packet. Meanwhile, the flits other than the header flit 1104 and the tail flit 1106 are mainly used to transmit data and are called "data flits" 1105.

On detecting the end code that is described in the control code field 1103, the memory on the receiving end restores those flits transmitted into the original packet based on that end code.

For example, one packet may have a size of 128 bytes, and one flit may have a size of either 32 bits or 64 bits. It should be noted, however, that these sizes are just an example because one packet size and one flit size may vary according to the application. Optionally, the length of a flit may be determined by a length that can describe control data using the receiving end's address and the transmitting end's address, for example.

Each relay device is provided with a buffer to accumulate the flits that have been received. Those flits are once accumulated in that buffer, and then forwarded to either a relay device leading to the target path or a memory at the destination by turning the switch. In the example illustrated in FIG. 6, flits are supposed to be transmitted from a bus master to a memory. However, this is just an example of the present invention. Rather the destination of the flits does not have to be a memory but may also be another bus master or an input/output interface to be connected to a peripheral device.

Figure 8:
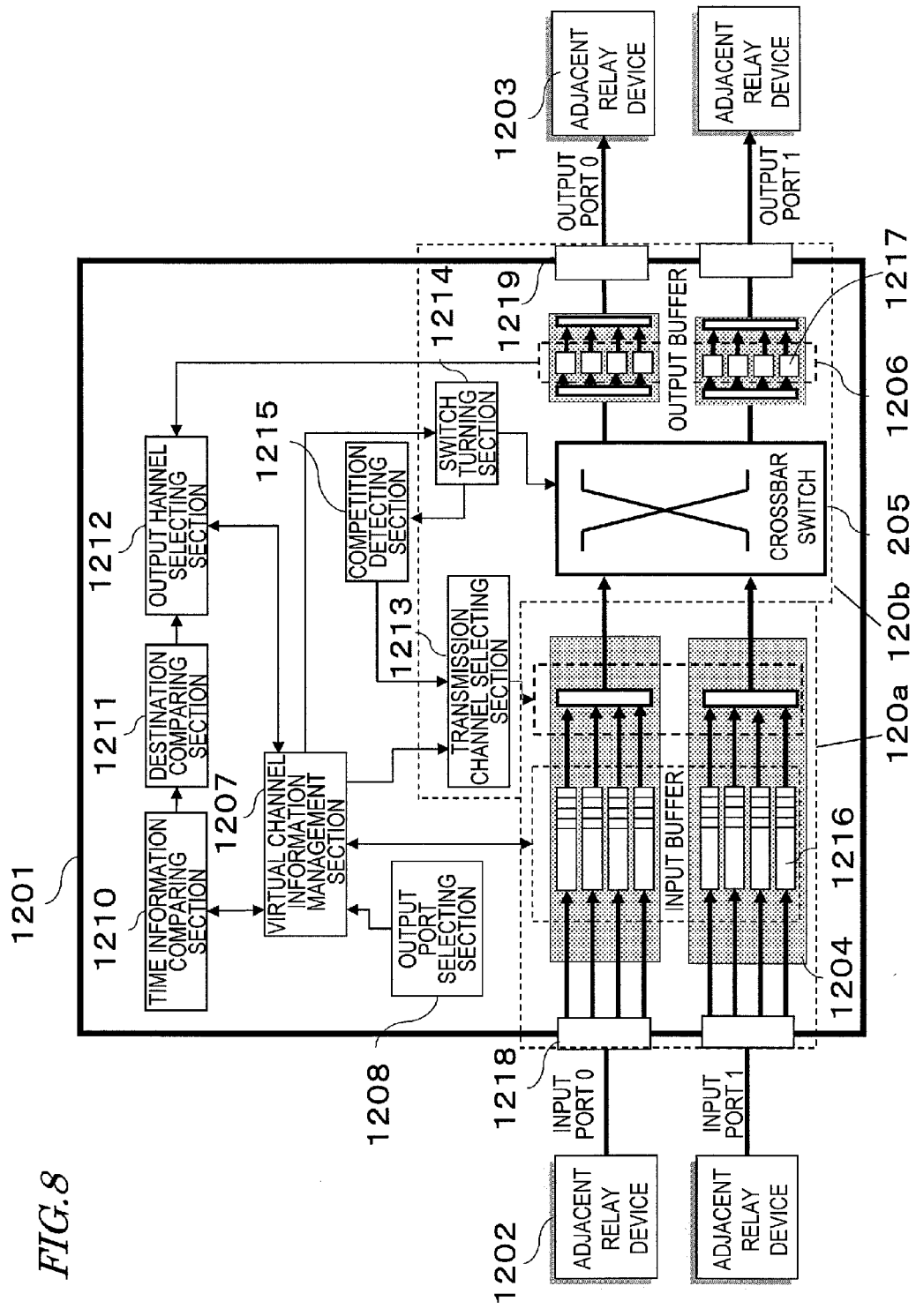
FIG. 8 illustrates a configuration for a relay device 1201 according to a first preferred embodiment of the present invention.

FIG. 8 illustrates a configuration for a relay device 1201 according to this preferred embodiment.

The relay device 1201 includes input buffers 1204, a switch 1205, output buffers 1206, a virtual channel information management section 1207, a time information comparing section 1210, a destination comparing section 1211, an output channel selecting section 1212, a transmission channel selecting section 1213, a switch turning section 1215, and a competition detecting section 1214.

Hereinafter, the functions of these components will be described one by one.

Each input port 1218 receives flits that have been transmitted from either an adjacent relay device or another transmission node.

Each input buffer 1204 is a buffer that accumulates the flits that have been transmitted from an adjacent relay device (or a transmission node) on the input port side.

One temporary buffer functioning as the input buffer 1204 may be provided for each input port of the relay device 1201. Or multiple virtual channels 1216 may be provided for each input port so that the transmission schedule can be controlled by using respective channels for different packets. In this preferred embodiment, four virtual channels 1216 are supposed to be provided for each input buffer 1204 as shown in FIG. 8.

The crossbar switch 1205 is a switch for changing exclusive connections between the input and output ports of the relay device 1201.

Each output port 1219 functions as a transmitting section for transmitting flits from this relay device to either an adjacent relay device or a reception node.

Each output buffer 1206 is a temporary buffer to be used when flits are transmitted to a group of relay devices 1203 that are connected to the output ports.

Each output buffer 1206 further has multiple output channels 1217. The output channels 1217 provided need to be as many as the virtual channels of the input buffers in the relay devices 1203, which are connected to the output buffers 1206 through the output ports 1219. And a one-to-one correspondence is defined between those output channels 1217 and the virtual channels of the group of adjacent relay devices 1203.

The flits that have been transmitted from this relay device 1201 through one of those output channels are accumulated in a virtual channel of an associated one of those relay devices 1203, which is connected to the output port provided for that output channel. That is to say, by selecting an output channel for transmitting the flits, this relay device 1201 can designate in which of the virtual channels of the relay device 1203 that is connected to the output port the flits transmitted should be stored.

The virtual channel information management section 1207 manages flit information to be stored in each virtual channel 1216. Detailed contents of the information managed by the virtual channel information management section 1207 will be described later with reference to FIG. 9.

When the input buffer 1204 newly receives a header flit, the output port selecting section 1208 gets that flit from the buffer 1204 and decodes the destination information described in the header flit, thereby determining to which relay device that flit needs to be forwarded.

The time information comparing section 1210 compares to each other the priorities based on the time information that has been given to the respective packets stored in those virtual channels, thereby ranking those virtual channels according to their degree of priority.

According to this preferred embodiment, the time information given to those packets is supposed to be the transmission time stamp of those packets. Also, as for the priority based on the time information, the longer the amount of time that has passed since a packet was transmitted (i.e., the earlier the transmission time stamp of a packet), the higher its degree of priority is supposed to be.

The destination comparing section 1211 classifies the virtual channels into multiple groups according to the destinations of the packets that are stored in the respective virtual channels and determines the order of allocation of virtual channels according to the amounts of time that have passed since those packets in the respective groups were transmitted.

In accordance with the result of comparison that has been made by the transmission time comparing section 1210 between the transmission times of those flits that are stored in the respective virtual channels and the result of comparison that has been made by the destination comparing section 1211 between their destinations, the output channel selecting section 1212 selects output channels 1217 that are not used by any of the output buffers 1206.

The transmission channel selecting section 1213 chooses, on an input port basis, one of multiple virtual channels as a virtual channel for transmitting the flits.

The switch turning section 1214 turns the crossbar switch 1205 so that by controlling the crossbar switch 1205, an exclusive output port is allocated to one virtual channel that has been chosen by the transmission channel selecting section 1213 for each input port.

If multiple virtual channels are competing with each other for a single output port to send a flit to, the competition detecting section 1215 instructs the input port, to which no output port has been allocated by the switch turning section 1214, to choose a different virtual channel to send the flit to another output port. The occurrence of such a competition can be sensed by determining whether or not the crossbar switch 1205 has been turned by the switch turning section 1214.

In this description, the input ports 1218, the input buffers 1204 and the virtual channels 1216, which contribute to the processing of storing flits that has been received by this relay device on the virtual channels, will be collectively referred to herein as an "input section" 120a. On the other hand, the crossbar switch 1205, the transmission channel selecting section 1213, the switch turning section 1214, the output buffers 1206, the output channels 1217, and the output ports 1219, which contribute to the processing of outputting those flits that are stored in the virtual channels from this relay device, will be collectively referred to herein as an "output section" 120b.

Figure 9:
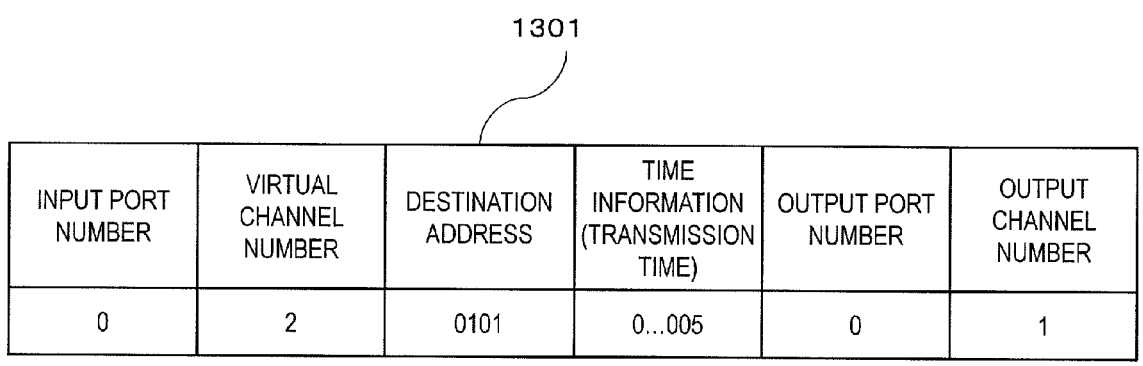
FIG. 9 shows an example of virtual channel information 1301 to be managed by, and stored in, a virtual channel information management section 1207.

FIG. 9 shows an example of virtual channel information 1301 to be managed by, and stored in, the virtual channel information management section 1207.

In order to identify each virtual channel, the virtual channel information includes an input port identification number and a virtual channel identification number. Furthermore, when a packet is stored on a virtual channel, the address information to specify the destination to which that packet should be sent, the time information indicating the amount of time that has passed since that packet was transmitted, and the respective numbers of an output port and an output channel to send the flit to that destination are managed. It should be noted that the time information does not have to be the time that has passed but may also be a packet transmitted time, for example.

Hereinafter, it will be described with reference to the flowchart shown in FIG. 10 and FIGS. 11 through 18 generally how this relay device 1201 operates. In FIGS. 11 through 18, any component also shown in FIGS. 8 and 9 and having substantially the same function as its counterpart is identified by the same reference numeral and description thereof will be omitted herein.

When the entire circuit is activated, the relay device 1201 enters a standby state and gets ready to receive a flit from either an adjacent relay device 1202 through an input port 1218 or a transmission node.

Figures 11A, 11B:
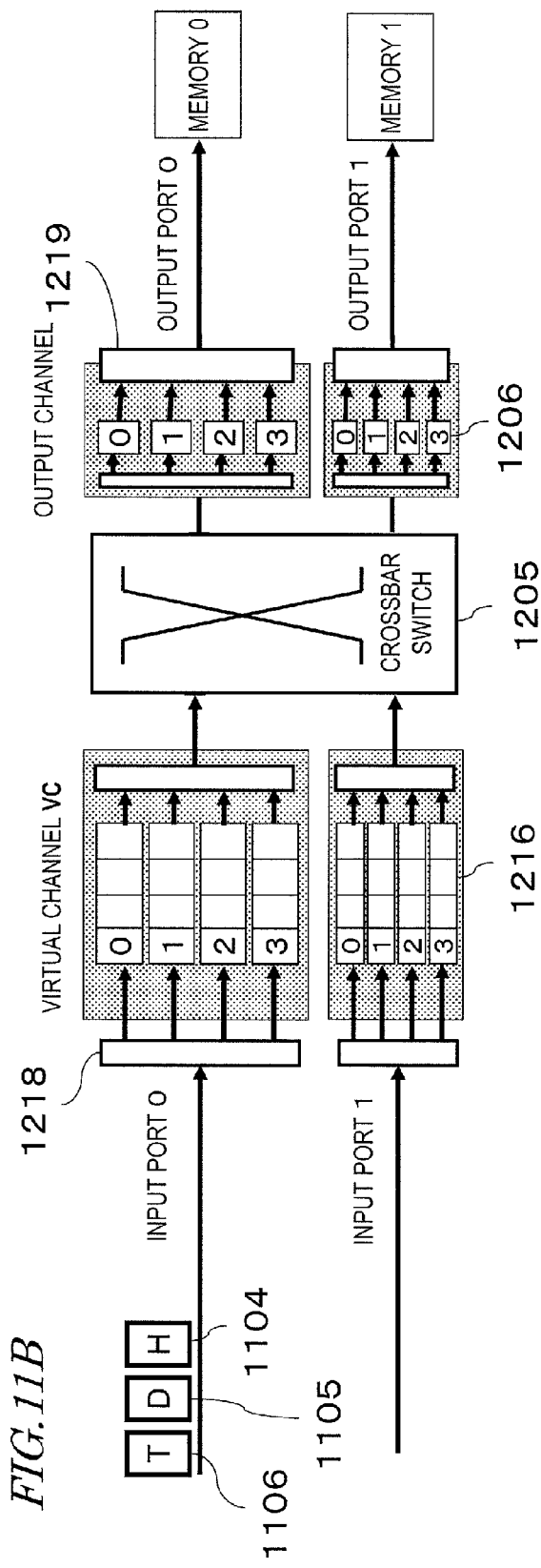
FIG. 11A shows virtual channel information 1301 of the input port #0.
FIG. 11B illustrates the statuses of the respective buffers, at a point in time when the relay device 1201 has not received any flit yet.

FIG. 11A shows virtual channel information 1301 of the input port #0, and FIG. 11B illustrates the statuses of the respective buffers, at a point in time when the relay device 1201 has not received any flit yet. In the rest of the description, the virtual channel information 1301 of only this input port #0 will be described as an example. In FIG. 11B, a header flit (H) 1104, a data flit (D) 1105 and a tail flit (T) 1106 are illustrated for your reference.

Since no flits have arrived yet, every virtual channel is still unused.

Figure 10:
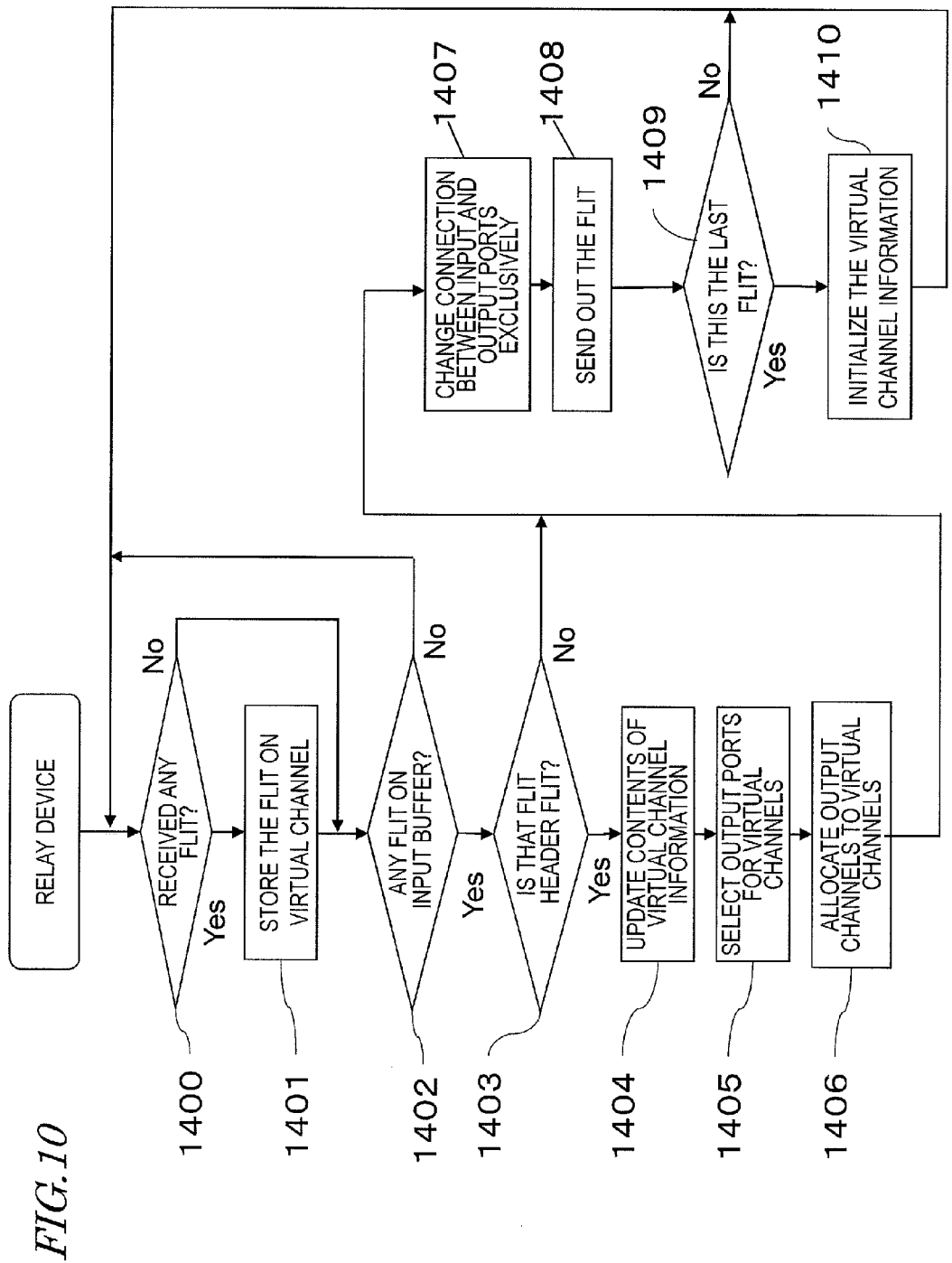
FIG. 10 is a flowchart showing the procedure of operation of the relay device 1201.

In Step 1400 shown in FIG. 10, the input port 1218 determines whether or not the relay device 1201 has received any flit yet. If the answer is YES, the process advances to Step 1401. Otherwise, the process advances to Step 1402. In Step 1401, the input port 1218 stores the received flit on the virtual channel 1216. It should be noted that it is the adjacent relay device 1202 that determines on which virtual channel 1216 the flit should be stored.

In Step 1402, the virtual channel 1216 determines whether or not there is any flit on the input buffer. If the answer is YES, the process advances to Step 1403. Otherwise, the process goes back to Step 1400.

In Step 1403, the virtual channel 1216 in the relay device determines whether or not the flit stored is a header flit 1104. If the answer is YES, the process advances to Step 1404. Otherwise, the process advances to Step 1407. In the latter case, the connection between a virtual channel and an output port may need to be changed even while a packet is being transmitted. That is the case if a flit with an earlier transmission time stamp arrives later than expected from another transmission node, for example. For that reason, this procedure is designed so that the process advances from Step 1103 to Step 1407 in such a situation. If an exclusive connection has already been ensured, then the process advances to Step 1408 without performing the processing step 1407 formally.

If the flit stored is a header flit, the virtual channel information management section 1207 updates the virtual channel information 1301 in Step 1404 with the destination address specified in that header flit and with the time information indicating the amount of time that has passed since the packet was transmitted from a transmission node.

Figures 12A, 12B:
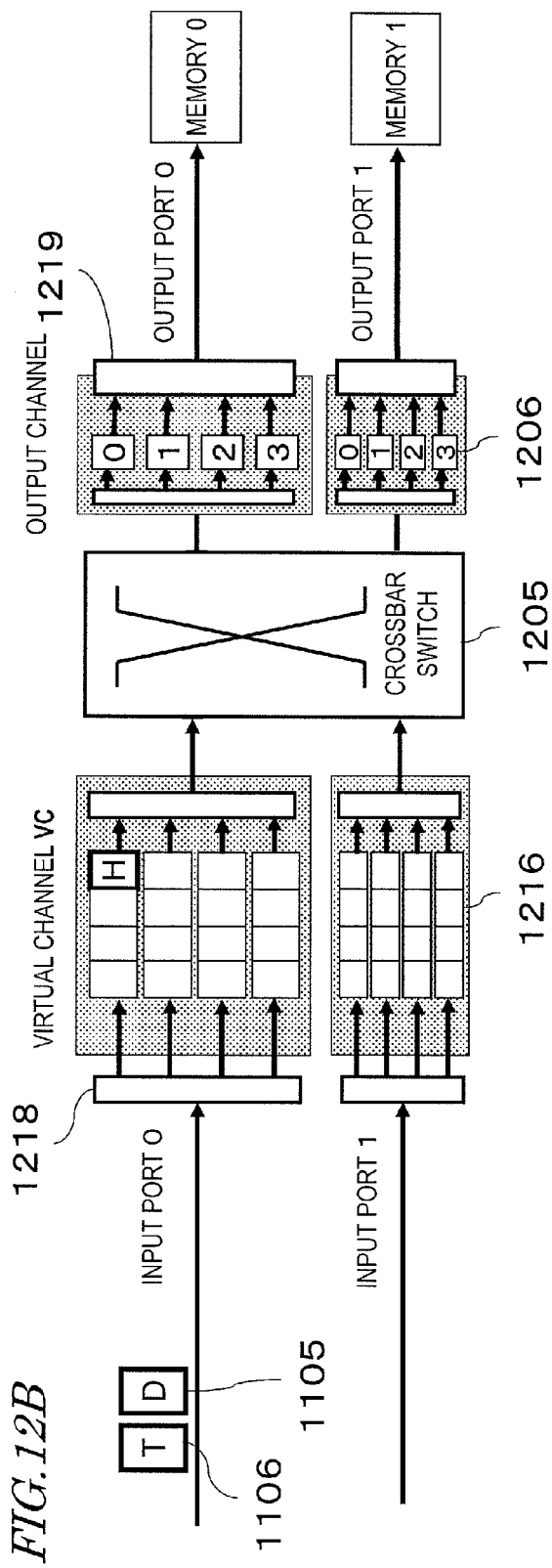
FIG. 12A shows the contents of the virtual channel information 1301 at a point in time when the relay device 1201 receives the header flit 1104.
FIG. 12B illustrates the statuses of the respective buffers at a point in time when the header flit 1104 that has been received at the input port #0 is stored on the virtual channel #0.

FIG. 12A shows the contents of the virtual channel information 1301 at a point in time when the relay device 1201 receives the header flit 1104.

FIG. 12B illustrates the statuses of the respective buffers at a point in time when the header flit 1104 that has been received at the input port #0 is stored on the virtual channel #0 in Step 1402.

When the header flit 1104 arrives at the virtual channel, the virtual channel information 1301 is updated with the destination address specified in the header flit 1104 and information about the transmission time of a packet including that header flit 1401.

The virtual channel information 1301 shown in FIG. 12A includes the destination address specified in the header flit 1104 and the transmission time information.

In this example, address "000" at memory #0 is supposed to be specified as the destination, to which the packet should be sent, the transmission time is supposed to be $20^{th}$ cycle, and both of these two pieces of information have been added to the virtual channel information 1301.

In Step 1405 shown in FIG. 10, the output port selecting section 1208 receives the header flit and selects output ports for virtual channels, to which no output port numbers have been set yet, in accordance with the virtual channel management information 1207.

For example, in the multistage interconnection network shown in FIG. 6, an address is assigned as a three-digit binary number to each memory and the destination address at the memory to which a packet should be sent is also specified as a three-digit binary number in the header flit of each packet.

The output port selecting section 1208 of each relay device reads, from left to right, the first, second or third digit of the three-digit address specified in the header flit. In this case, the position of the digit to be read should be the same as that of the stage of a given relay device. And if the value is zero, the output port selecting section 1208 determines the path so that the flit is sent to the upper-right relay device shown in FIG. 5. On the other hand, if the value is one, the output port selecting section 1208 determines the path so that the flit is sent to the lower-right relay device shown in FIG. 5.

For example, suppose data needs to be transmitted from bus master BM2 to memory #5 (specified by address "101"). In that case, in accordance with the three-digit number specified as the address, first of all, the relay device R1 transmits the flit to its lower-right relay device R7. Next, the relay device R7 transmits the flit to its upper-right relay device R10. And then the relay device R10 transmits the flit to its lower-right memory #5. In this manner, the flit can be transmitted from the bus master BM5 to the memory #2.

It should be noted that as long as a flit can be delivered to its destination appropriately according to the topology of the distributed buses, the output port selecting section 1208 may also select an output port by any other method instead of the method described above.

Figures 13A, 13B:
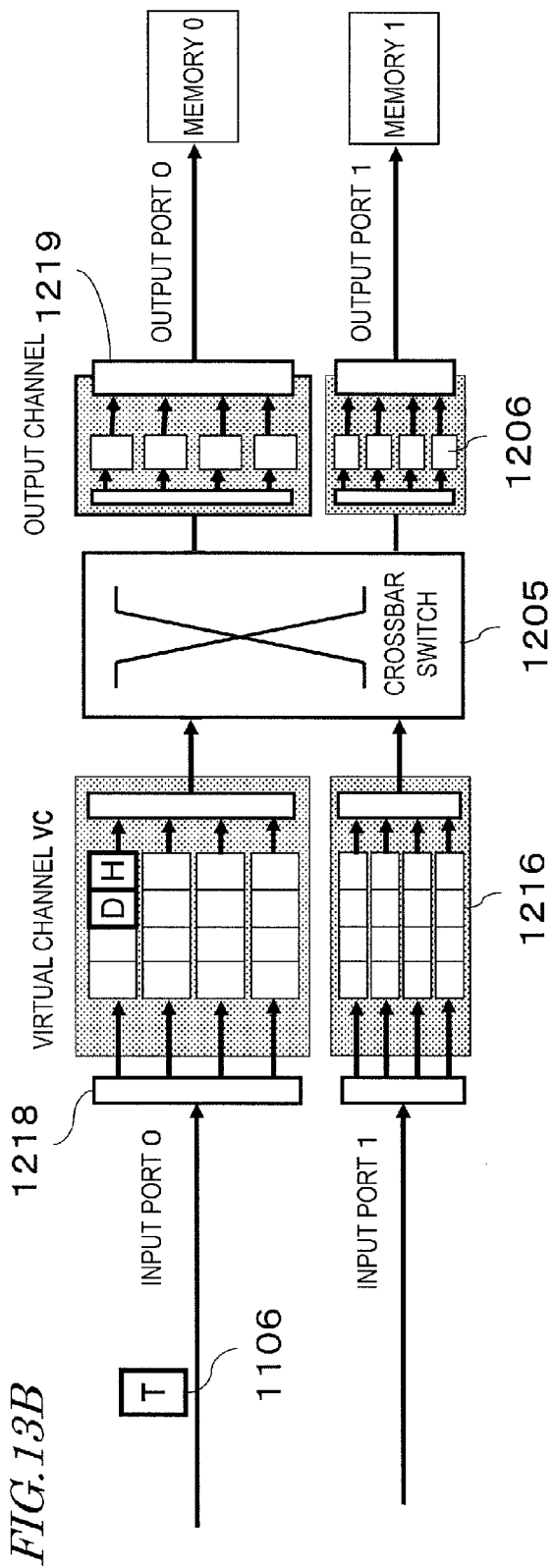
FIG. 13A shows the contents of the virtual channel information 1301 at a point in time when the relay device 1201 has allocated output ports to virtual channels.
FIG. 13B illustrates the statuses of the respective channels at that point in time.

FIG. 13A shows the contents of the virtual channel information 1301 at a point in time when the relay device 1201 has allocated output ports to virtual channels. FIG. 13B illustrates the statuses of the respective channels at that point in time.

As shown in FIG. 13A, a flit that should be sent to memory #0 with the destination address "000" is stored on the virtual channel #0 of the input port #0. That is why in order to send out the flit through the output port #0 leading to that memory #0, the virtual channel 1216 sets the output port number to be 0.

In Step 1406 shown in FIG. 10, the time information comparing section 1210, the destination comparing section 1211, and the output channel selecting section 1212 refer to the destinations specified for flits and the transmission times of packets, representing the degrees of priority based on the time information, which are stored in the virtual channel information management section 1207 with respect to virtual channels for which output channels have not been allocated yet, thereby allocating an output channel to a virtual channel, in which a packet that was transmitted earlier than any other packet is stored.

Figures 14A, 14B:
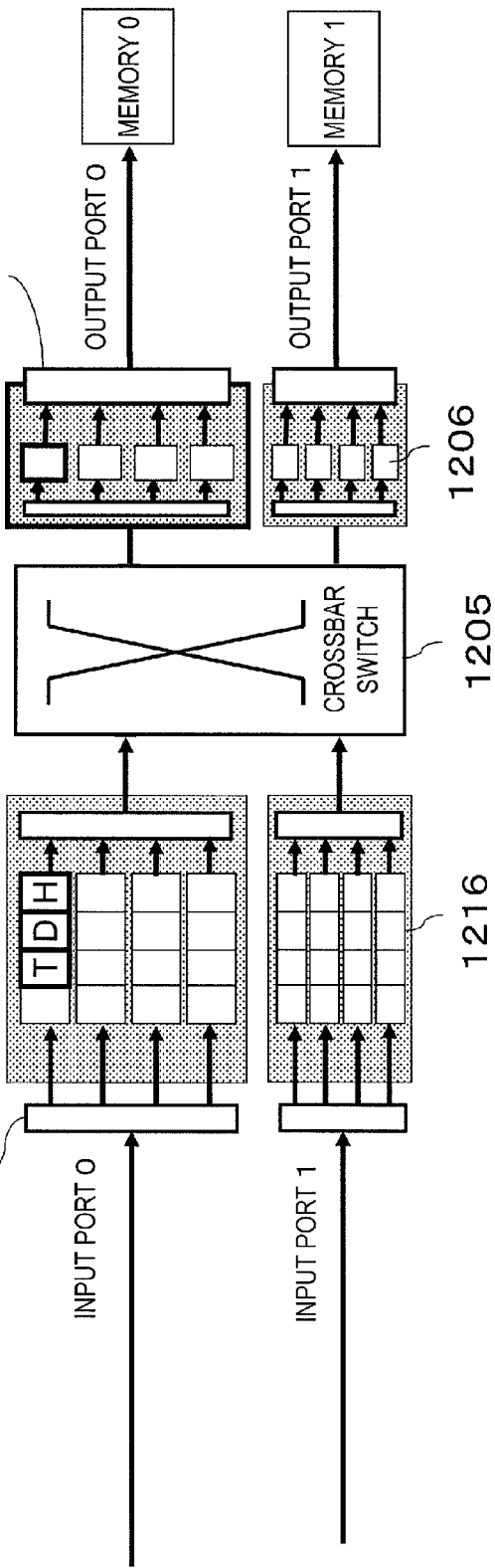
FIG. 14A shows the contents of the virtual channel information 1301 at a point in time when the relay device 1201 has allocated the output channel.
FIG. 14B illustrates the statuses of the respective channels at that point in time.

FIG. 14A shows the contents of the virtual channel information 1301 at a point in time when the relay device 1201 has allocated the output channel, and FIG. 14B illustrates the statuses of the respective channels at that point in time.

As shown in FIG. 14B, every output channel of the output port #1 is still unused. In this preferred embodiment, to make the virtual channel #0 of the input port #0 use the output port #0, the output channel number is set to be 0 as shown in FIG. 14A.

As for how to allocate output channels in a situation where multiple packets are stored in the relay device, it will be described in detail later with reference to FIG. 17.

In Step 1407 shown in FIG. 10, the transmission channel selecting section 1213 chooses one of the virtual channels, to which output channels have already been allocated, on an input port basis by reference to the virtual channel information 1301.

Meanwhile, by reference to the virtual channel information 1301, the switch turning section 1214 determines whether or not there is any competition at the output port, in which the virtual channel that has been chosen by the transmission channel selecting section 1213 is combined with the output channel. If the answer is YES, the switch turning section 1214 chooses one of those virtual channels that are competing against each other.

As a result, an exclusive connection is selected between input and output ports. And based on the result, the switch turning section 1214 turns the crossbar switch 1205.

After the crossbar switch has been turned, the virtual channel 1216 that has been selected by the transmission channel selecting section 1213 sends out the flit in Step 1408 through its associated output channel 1206 at the output port.

Figures 15A, 15B:
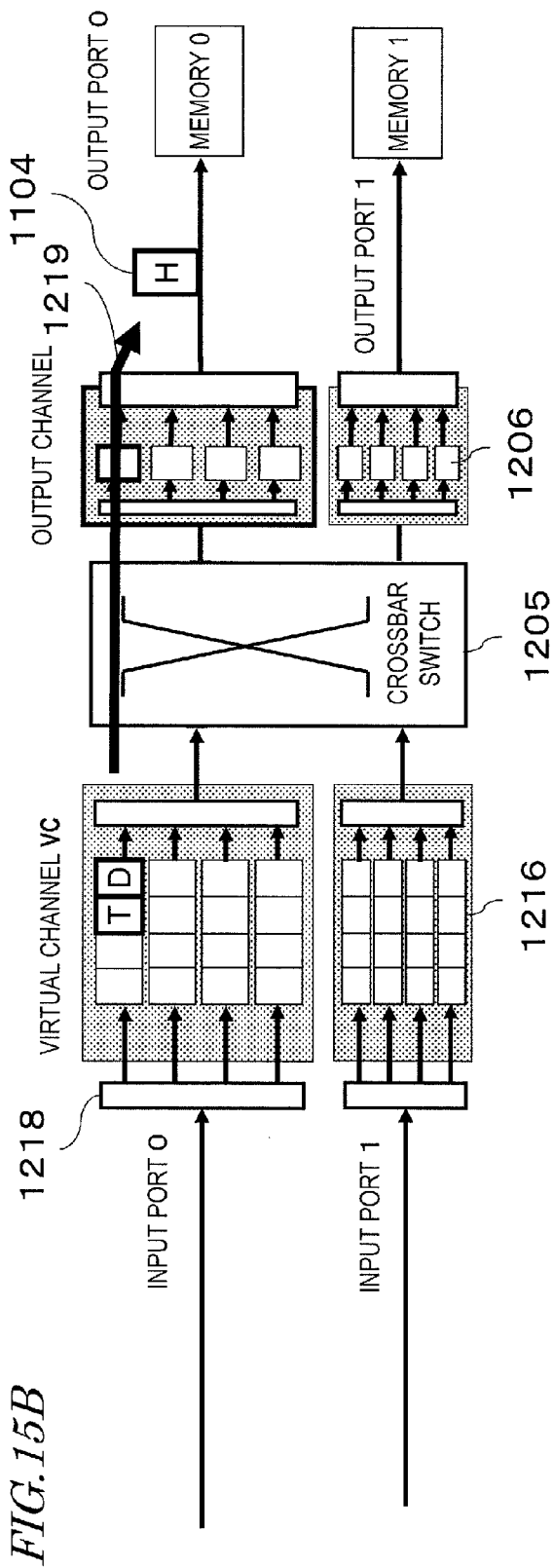
FIG. 15A shows the contents of the virtual channel information 1301 at a point in time when the relay device 1201 is transmitting the flits.
FIG. 15B illustrates the statuses of the respective channels at that point in time.

FIG. 15A shows the contents of the virtual channel information 1301 at a point in time when the relay device 1201 is transmitting the flits, and FIG. 15B illustrates the statuses of the respective channels at that point in time.

In FIGS. 15A and 15B, there is only one packet being processed in the relay device. That is why flits that are stored on the virtual channel #0 at the input port #0 are sequentially transmitted one after another to the memory #0 through the output channel of the output port that is specified in the virtual channel information 1301.

Then, in Step 1409 shown in FIG. 10, the virtual channel 1216 determines whether or not the flit being transmitted is the last one of the flits that form the given packet.

If the flit being transmitted is the last one of the flits that form the given packet, then that virtual channel needs to be freed in Step 1410 so that a different packet can use that virtual channel. In that case, the virtual channel information management section 1207 initializes the information of the virtual channel in question.

Figures 16A, 16B:
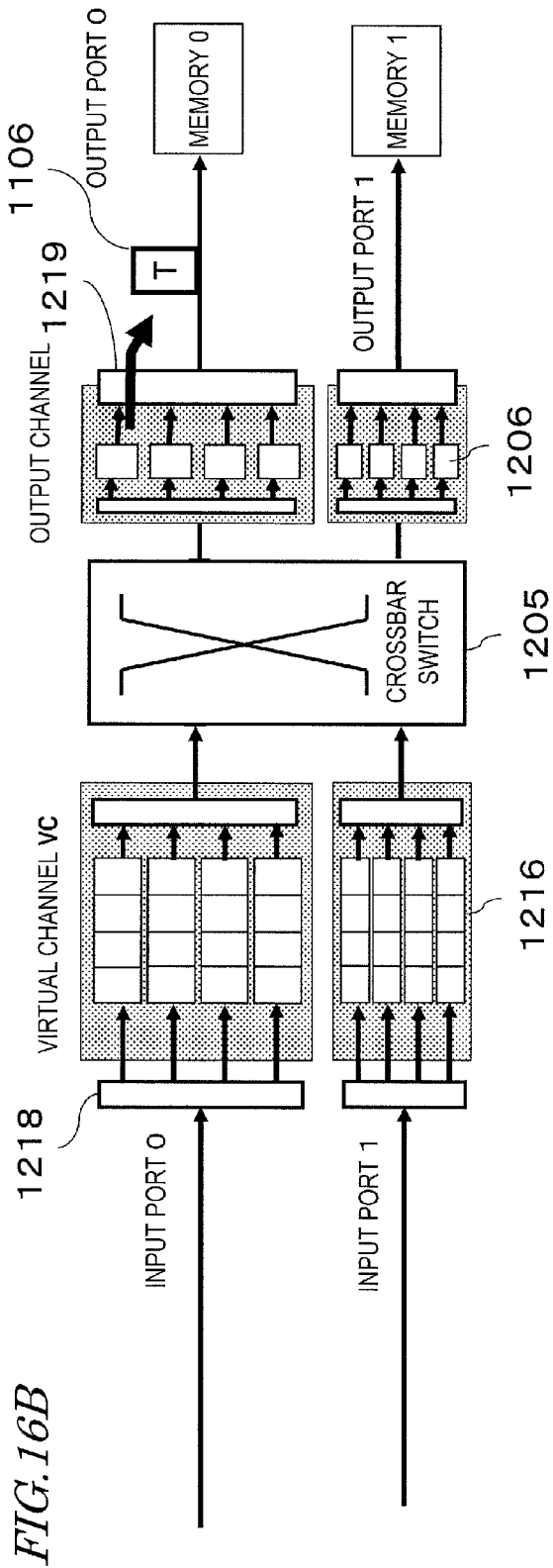
FIG. 16A shows the contents of the virtual channel information 1301 at a point in time when the tail flit 1106 has been transmitted.
FIG. 16B illustrates the statuses of the respective channels at that point in time.

FIG. 16A shows the contents of the virtual channel information 1301 at a point in time when the tail flit 1106 has been transmitted, and FIG. 16B illustrates the statuses of the respective channels at that point in time.

In FIGS. 16A and 16B, the tail flit 1106 has already been transmitted, and therefore, every flit that was stored on the virtual channel #0 at the input port #0 has already gone and the virtual channel #0 is now in unused state. Thus, the contents of the virtual channel information 1301 about the virtual channel #0 are initialized.

By performing this series of processing steps 1401 through 1410 a number of times, the relay device 1201 can transmit the packets received to reception nodes as their destinations.

Hereinafter, it will be described in detail with reference to FIG. 17 how to get done the processing step 1406 of allocating an output channel to a virtual channel on which the header flit 1104 is stored. In addition, it will also be described with reference to FIG. 19 how to get done the processing step 1407 of changing the connection between the input and output ports exclusively.

Figure 17:
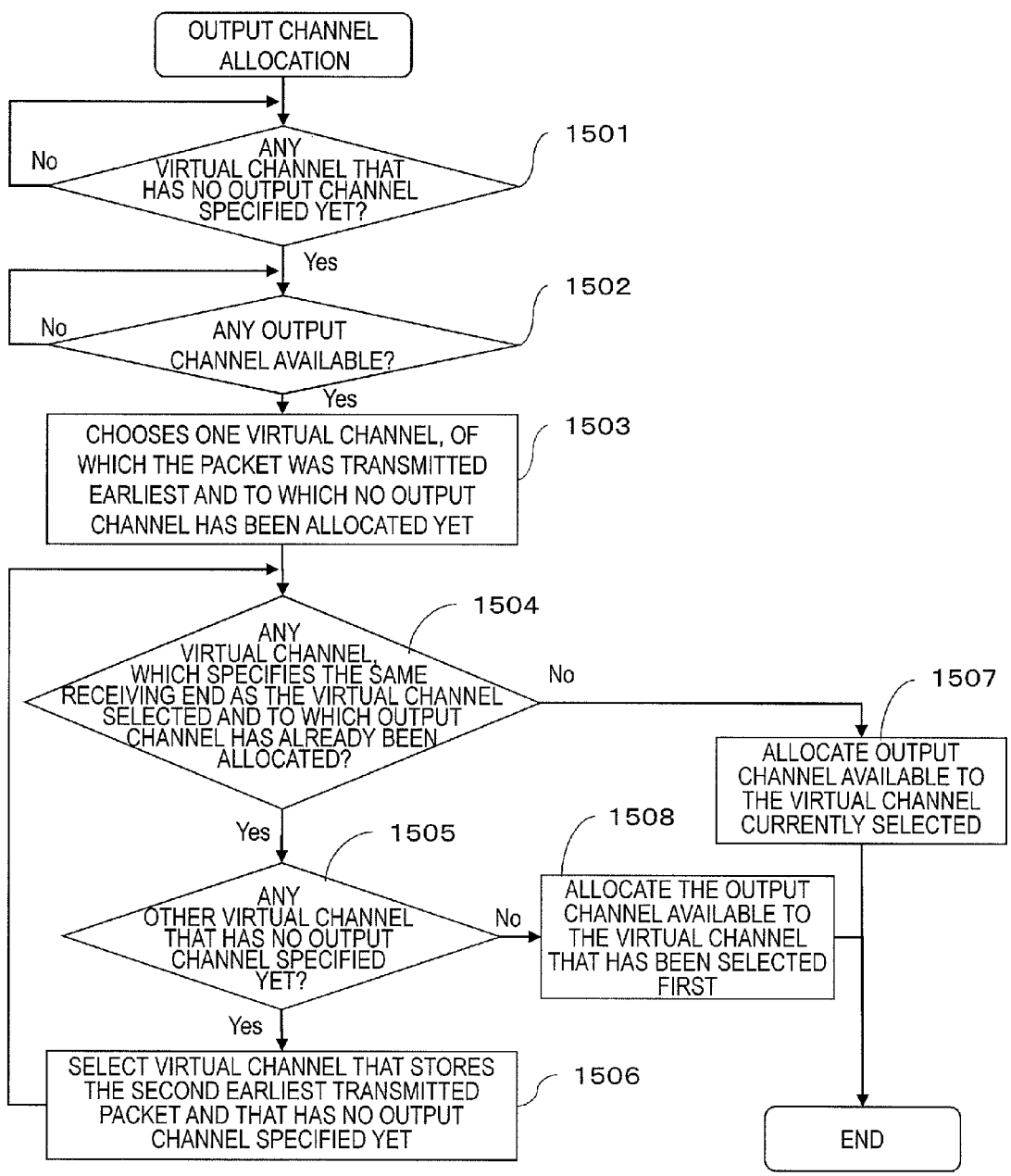
FIG. 17 is a flowchart showing a procedure in which an output buffer 1206 is allocated to virtual channels 1216.

FIG. 17 shows a procedure in which an output buffer 1206 is allocated to virtual channels 1216.

Figures 18A, 18B:
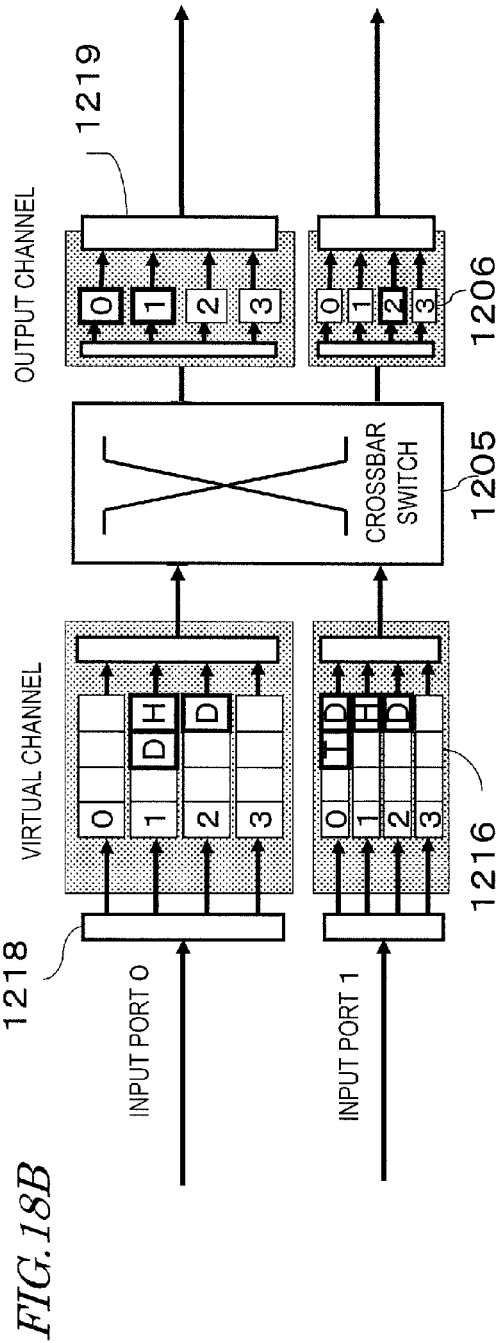
FIGS. 18A and 18B show the contents of buffer management information 1301 and the statuses of respective buffers in a situation where flits that form multiple packets are already stored in the relay device 1201.

In this example, flits that form multiple packets are already stored in the relay device 1201, the contents of buffer management information 1301 are as shown in FIG. 18A and the statuses of the respective buffers are as shown in FIG. 18B, in which header, data and tail flits H, D and T are shown. This means that multiple packets have been received at the input ports #0 and #1, and are now being output, in parallel with each other.

First of all, in Step 1501, the output channel selecting section 1212 of the relay device 1201 sees if there are any virtual channels, to which an output port has already been allocated but no output channels have been allocated yet.

According to the buffer management information 1301 shown in FIG. 18A, no output channels have been allocated yet to the virtual channel #1 at the input port #0 and the virtual channel #1 at the input port #1.

If there are such virtual channels to which an output port has already been allocated but no output channels have been allocated yet, then the buffer management information 1301 is referred to in Step 1502 to see if there are any output channels available from the output ports.

According to the virtual channel information 1301 shown in FIG. 18A, the output port #1 is specified for both of the virtual channel #1 at the input port #0 and the virtual channel #1 at the input port #1.

As for the output channels at the output ports, on the other hand, only the output channel #2 is used by the virtual channel #2 at the input port #1 but the other output channels are not used and all available according to the virtual channel information 301 shown in FIG. 18A.

Next, in Step 1503, the time information comparing section 1201 compares the time-information-based priorities (i.e., how early the packet was transmitted from a bus master BM) to each other in those virtual channels to which no output channels are allocated, ranks those virtual channels according to their degree of priority (i.e., their transmission time), and chooses one of those virtual channels, of which the packet was transmitted earlier than any other virtual channel's and to which no output channel has been allocated yet.

According to the buffer management information 1301 shown in FIG. 18A, the virtual channel #1 at the input port #1, which has an earlier transmission time, stores a packet that was transmitted earlier than any other one of the virtual channels to which no output channels have been allocated yet, and therefore, is selected as a candidate to which an output channel should be specified.

Next, in Step 1504, the destination comparing section 1211 determines whether or not there is any virtual channel 1216, which specifies the same destination as the virtual channel selected and to which an output channel 1217 has already been allocated. If the answer is YES, the process advances to Step 1505. Otherwise, the process advances to Step 1507.

According to the virtual channel information 1301 shown in FIG. 18A, an output port has already been allocated to the virtual channel #2 at the input port #1 that specifies the same destination address as the virtual channel #1 at the input port #1. Thus, the process advances to Step 1505.

Then, in Step 1505 shown in FIG. 17, the output channel selecting section 1212 determines whether or not there is any virtual channel that stores a packet that was transmitted earliest but the virtual channel currently selected and that has no output channel specified yet. If the answer is YES, the process advances to Step 1506. Otherwise, the process advances to Step 1508.

According to the virtual channel information 1301 shown in FIG. 18A, there is such a virtual channel that stores a packet that was transmitted earliest but the virtual channel #1 currently selected at the input port #1 and that has no output channel specified yet. Thus, the process advances to Step 1506.

In Step 1506, the output channel selecting section 1212 selects, as a candidate to which an output channel should be newly specified, such a virtual channel that stores a packet that was transmitted earliest but the virtual channel currently selected and that has no output channel specified yet.

According to the virtual channel information 1301 shown in FIG. 18A, the virtual channel #1 at the input port #0 that stores a packet that was transmitted earliest but the virtual channel #1 currently selected at the input port #1 and that has no output channel specified yet is selected as a candidate to which an output channel should be newly specified. The output channel selecting section 1212 determines whether or not there is any virtual channel, which specifies the same packet destination as the virtual channel selected and to which an output channel has already been allocated (i.e., performs the processing step 1504 all over again).

If the answer to the query of the processing step 1504 is NO, the process advances to Step 1507, in which the output channel selecting section 1212 allocates an output channel available to the virtual channel currently selected.

According to the virtual channel information 1301 shown in FIG. 18A, there is no virtual channel that specifies the same packet destination as the virtual channel #1 at the input port #0, (i.e., the candidate to which an output channel should be newly specified and which has no output port specified yet) and to which an output channel has already been allocated. Thus, the process advances to Step 1507, in which an output channel is allocated.

If it has been determined in Step 1505, by performing the series of processing steps 1504 through 1506 a number of times, that there is no other virtual channel to which an output channel has yet to be specified, then the process advances to Step 1508, in which an output channel available is allocated to the virtual channel that has been selected first (i.e., the virtual channel that has the earliest packet transmitted time stamp and that has no output channel allocated yet). This is because since at least one output channel has already been allocated to every destination, it has been determined that allocating a remaining output channel to the earliest transmitted packet be preferred to allocating output channels uniformly between multiple different destinations.

In Step S1508, the output channel selecting section 1212 sets the output channel available to be the virtual channel that has been selected for the first time.

By performing the processing steps 1504 through 1508, it can be seen, according to the virtual channel information 1301 shown in FIG. 18A, that when compared in terms of the time passed alone, the virtual channel #1 at the input port #1 stores a flit that was transmitted earlier than any other virtual channel that has no output channel allocated yet. However, the destination (i.e., address "011") of that flit is the same as that of the flit that is stored on the virtual channel #2 at the input port #1. And the output channel #2 has already been allocated to that virtual channel #2 at the input port #1. That is why an available channel at the output port #1 is allocated to the virtual channel #1 at the input port #0.

As described above, by performing the series of processing steps 1501 through 1508 shown in FIG. 17 a number of times, an output channel can be allocated, on a destination basis, to only a virtual channel that stores the earliest transmitted packet. Consequently, it is possible to avoid an unwanted situation where every output channel (i.e., a virtual channel at its associated output port) is occupied by packets to be sent to the same destination.

Figure 19:
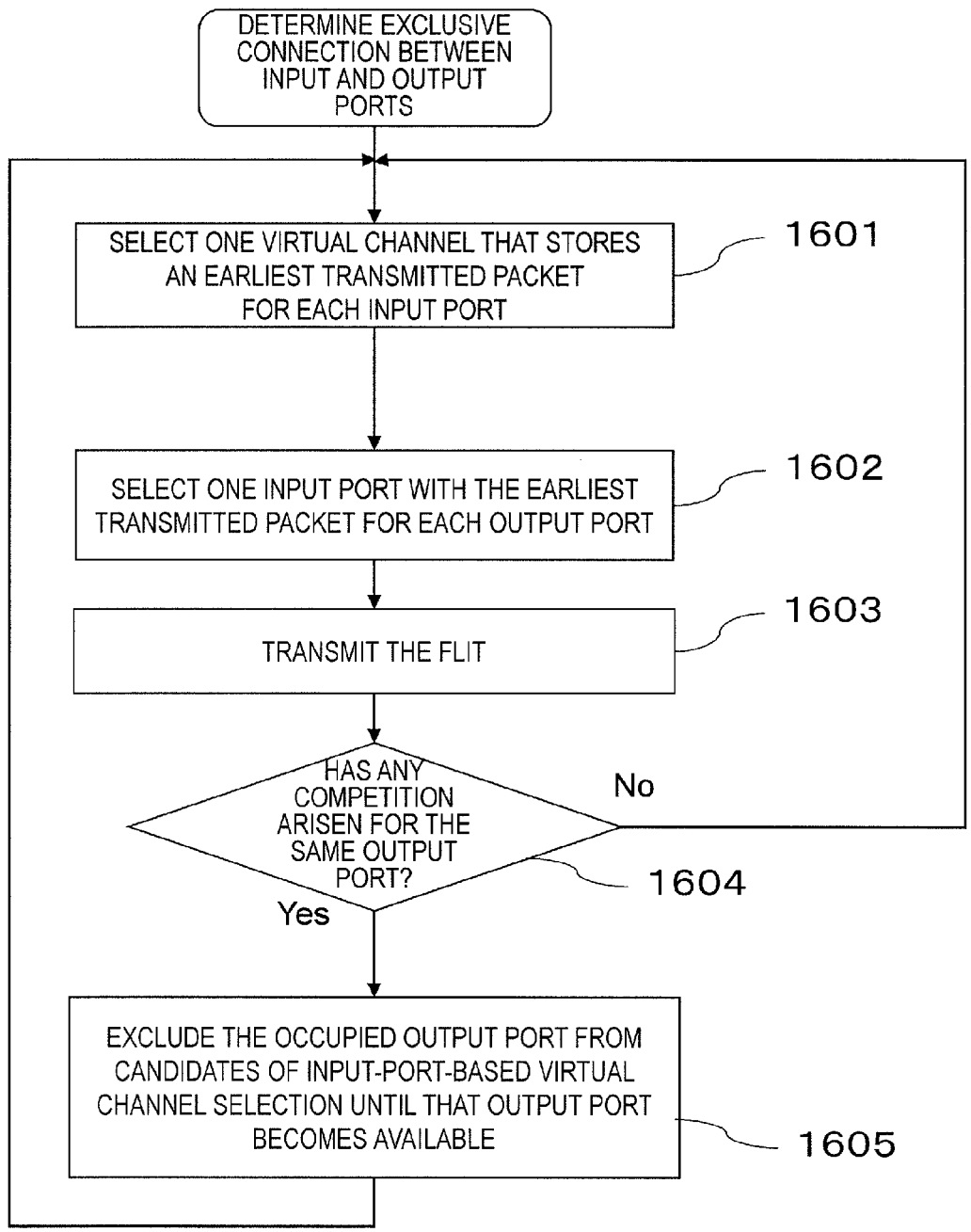
FIG. 19 shows how to turn a crossbar switch that connects exclusively an input port to an output port.

FIG. 19 shows how to turn a crossbar switch that connects exclusively an input port to an output port.

In order to maintain the order of transmission of packets and to minimize an increase in propagation delay, the relay device 1201 transmits sequentially the packets (or flits) that are stored on multiple virtual channels 1216 so that a packet that was transmitted from a transmission node earliest is transmitted first.

In a situation where input and output ports need to be connected exclusively by turning a crossbar switch, the greater the number of pairs of input and output ports connected at the same time at their requests, the greater the number of flits that can be transferred.

That is why parallel computers and ATM networks adopt the Wavefront Allocator method (as disclosed in Non-Patent Document No. 1) for searching all possible combinations of input and output ports for the best combination every time the crossbar switch is turned or the Parallel Interactive Matching method for determining the best combination of virtual channels by performing the processing of selecting a virtual channel to send a flit through a number of times at the input and output ports independently of each other.

However, since a relay device is implemented on an integrated circuit in an NoC, it is difficult to apply such a method for use in parallel computers and ATM, which requires either a lot of computational complexity or a huge number of times of repetition, as it is to the NoC, considering various constraints on the chip area allocated and the permissible time delay or power dissipation. That is why it is preferred that a greater number of input and output ports be connected together by using an even simpler configuration and by performing processing of an even lesser degree of computational complexity.

In view of these considerations, in a preferred embodiment of the present invention, the virtual channel to send a flit through is selected only once at each of the input and output ports independently of each other, and the result of the selection at the output port is fed back to the next result of input switching, thereby connecting as great a number of combinations of input and output ports as possible by turning the crossbar switch.

For that purpose, the transmission channel selecting section 1213 selects, in Step 1601, one virtual channel that stores an earliest transmitted packet for each input port.

Next, if a competition for the use of the same output port has arisen among the virtual channels that have been selected in the previous processing step 1601 by the transmission channel selecting section 1213 for the respective input ports, the switch turning section 1214 selects, in Step 1602, one virtual channel that stores the earliest transmitted packet for each output port and turns the crossbar switch 1205 so that the virtual channel selected is connected to the output port.

Next, when the crossbar switch is turned, the virtual channel that has been selected by the switch turning section 1214 transmits in Step 1603 the flit stored there.

Then, in Step 1604, the competition detecting section 1213 determines whether or not a competition to get of the same output port has arisen among the virtual channels that have been selected in Step 1602 by the transmission channel selecting section 1213. Specifically, the competition detecting section 1213 is notified by the switch turning section 1214 whether the switch has been turned successfully or not. If the answer is YES, it can be said that there is no competition there. On the other hand, if the switch has not been turned yet successfully, then it can be said that a competition has arisen between them. In this manner, by reference the state of the switch, the competition detecting section 1213 determines whether or not any competition has arisen there.

If it has turned out that a competition to get the same output port has arisen among the virtual channels, then the competition detecting section 1213 notifies the transmission channel selecting section 1213 in Step 1605 of a virtual channel that has not been selected by the switch turning section 1214. In response, the transmission channel selecting section 1213 selects a virtual channel that stores an earliest transmitted packet from the virtual channels that attempt to send packets to other output ports for the input port that has failed to get the output port. Then, the process goes back to the processing step 1602.

By performing this series of processing steps 1601 through 1605 a number of times, the crossbar switch is turned so as to connect exclusively as many input and output channels as possible and to improve the transfer performance as much as possible.

As described above, the relay device 1201 of this first preferred embodiment distinguishes the destinations of packets and allocates a limited number of virtual channels available to packets with mutually different destinations in an NoC relay device, thereby avoiding an unwanted situation where packets to be sent to the same destination occupy some virtual channels of the relay device and prevent packets to be sent to other destinations from being transmitted. As a result, the decline in transfer performance can be minimized in terms of throughput, time delay and jitter.

According to this preferred embodiment, the time information comparing section 1201 defines the degrees of priority based on the time information that has been given to packets by the transmission time stamp of the packets, and allocates an output channel preferentially to a packet that was transmitted earlier than any other packet. However, the degrees of priority may also be defined, and the output channels may also be allocated, based on time information other than the transmission times.

Figure 20:
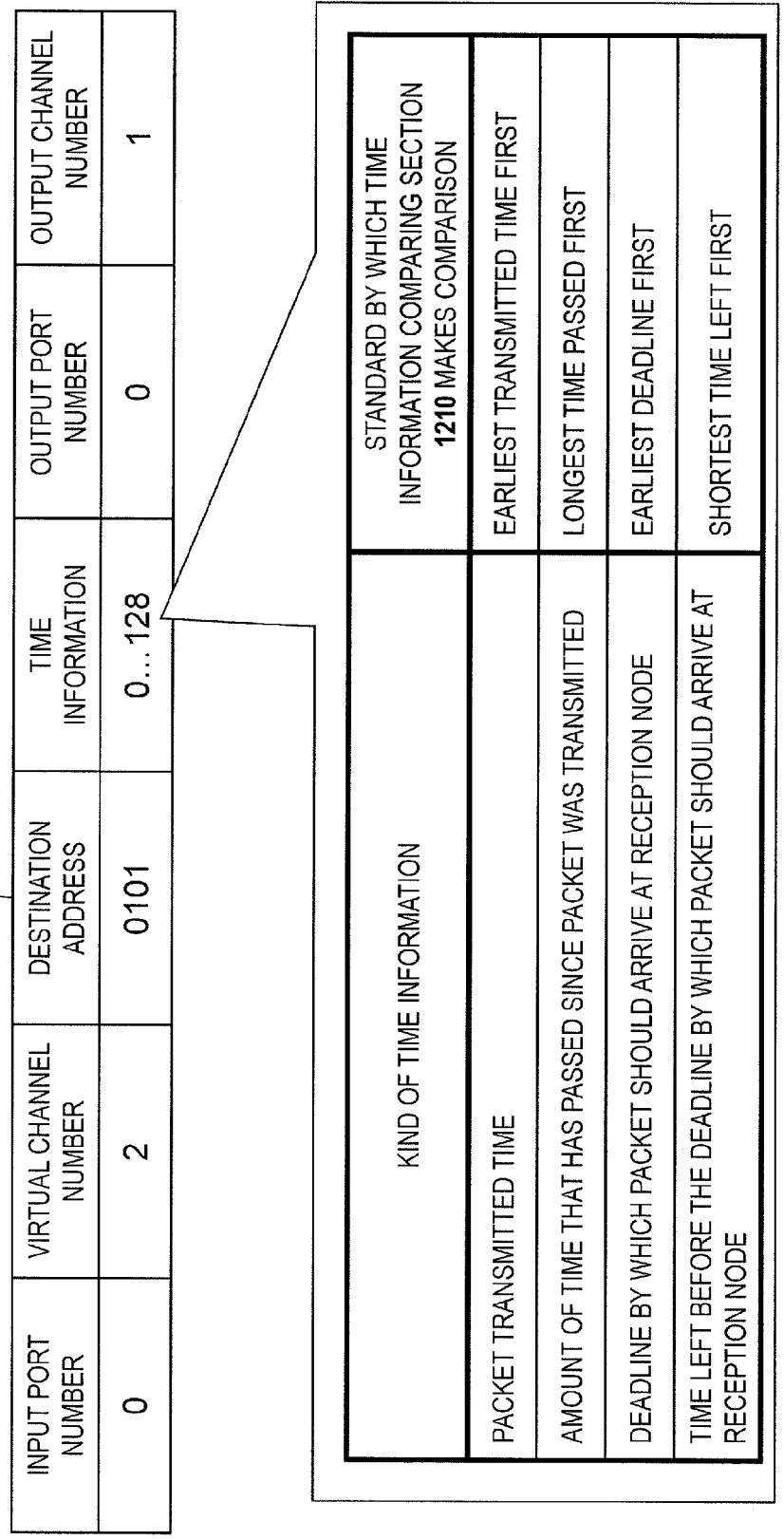
FIG. 20 shows an example of the time information and also shows how to compare degrees of priority based on the time information.

FIG. 20 shows an example of the time information and also shows how to compare degrees of priority based on the time information.

As the time information, the amount of time that has passed since a packet was transmitted may be used, for example.

In order to manage the transmission time as a piece of time information, the number of digits of the time information should be large enough to represent the overall running time of a semiconductor system. That is why the longer the running time of a semiconductor system, the larger the number of digits of the time information should be.

On the other hand, if the amount of time that has passed since a packet was transmitted is used as a piece of time information, then the number of digits of the time information just needs to be large enough to represent the time it takes to receive a packet that has been transmitted and can be much smaller than the case mentioned above. And the smaller the number of digits of the value treated as the time information, the smaller the time information comparator can be in the time information comparing section 1210. As a result, the resources needed to establish a semiconductor system can be cut down effectively.

Also, even if the transmission time is adopted, the number of digits to be treated as the time information can be reduced by using only a part of a transmission time stamp to be represented by month/day/year/hour/minute/second. For example, if the number of digits of a transmission time stamp is M, then the least significant n digits (where n is an integer that satisfies M>n) of M may be used. The n-digit value may have a number of digits that is large enough to represent the time it takes to receive a packet that has been transmitted.

In that case, the time information comparing section 1201 allocates an output channel preferentially to a packet that was transmitted earlier than any other packet by giving such a packet a top time-information-based priority.

Still alternatively, a deadline, by which a packet should arrive at its reception node, may also be used as the time information and an output channel may be allocated sequentially to a packet that has the earliest deadline first.

Generally speaking, the time delay permitted until a packet arrives at a reception node varies according to the type of the bus master and the contents of the processing. That is why suppose a situation where multiple packets with relatively late deadlines are transmitted from a transmission node and then a packet with a relatively early deadline is transmitted. In that case, if the relay device transmits the packets with an output channel allocated preferentially to a packet with the earliest deadline first rather than transmitting the packets with output channels allocated sequentially to the packets in the order of transmission times, a greater number of packets can meet the permissible time delay.

In that case, the time information comparing section 1201 allocates an output channel preferentially to a packet, of which the deadline by which the packet should arrive at its reception node is closest to the current time, by giving such a packet a top time-information-based priority.

Still alternatively, not the deadline itself but the time left until the deadline may also be used as the time information.

In that case, the time information comparing section 1201 allocates an output channel preferentially to a packet, of which the deadline by which the packet should arrive at its reception node is the shortest way off the current time, by giving such a packet a top time-information-based priority.

In the preferred embodiment described above, the destination comparing section 1211 is supposed to specify the destination by the addresses of the reception nodes. However, this is just an example and the destinations do not always have to be specified by the addresses of the reception nodes.

Figures 21A, 21B:
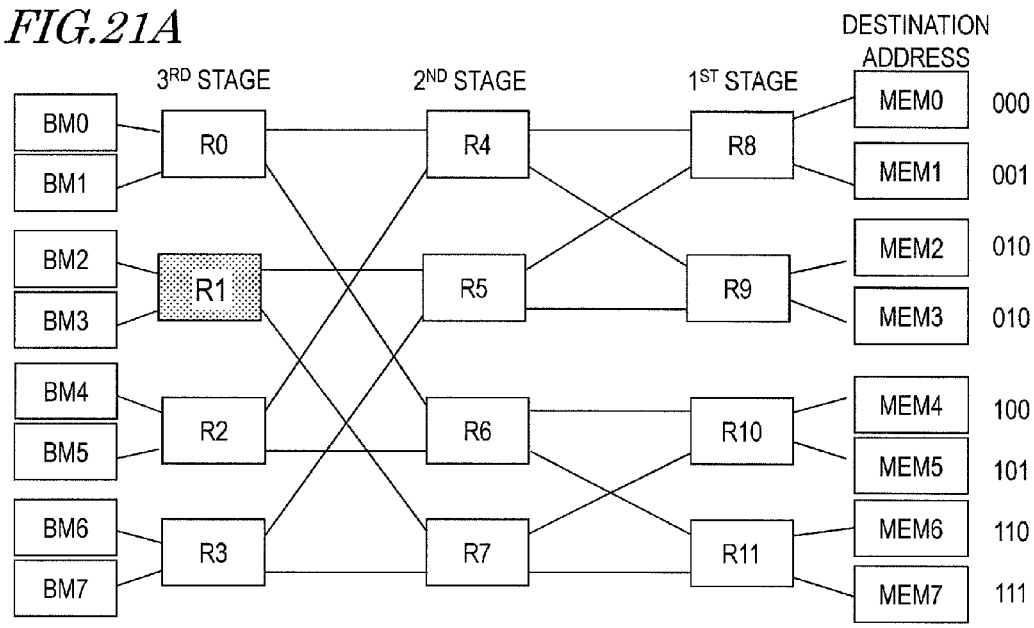
FIGS. 21A and 21B show various definitions of a destination as viewed from the relay device R1 and specific examples of destinations according to those definitions.

Alternatively, a relay device may be specified as the destination, for example. FIGS. 21A and 21B show various definitions of a destination as viewed from the relay device R1 and specific examples of destinations according to those definitions. For example, in the architecture shown in FIG. 21A, one of the relay devices to be passed by a packet on the transmission route to its reception node may be defined as a destination.

If the reception node (i.e., a memory) is defined to be the destination of the relay device R1 shown in FIG. 21A, then any of the eight memories #0 through #7 could be the destination for the relay device R1. However, if a relay device that is located at most two hops away from the current relay device R1 is defined to be its destination, then one of the four relay devices R8 through R11 could be its destination. Furthermore, if a relay device that is located only one hop away from the current relay device R1 is defined to be the destination, then one of the two relay devices R5 and R7 could be its destination.

By defining a relay device on the transmission route to be a destination in this manner, the number of destinations to be compared by the destination comparing section 1211 can be smaller than a situation where a memory as a reception node is defined to be a destination. As a result, the complexity of the destination comparison processing to be performed on the virtual channels can be cut down.

If a packet arrives at the destination relay device, then that relay device may define its destination all over again according to any of the definitions shown in FIG. 21B and then forward the packet.

Embodiment 2

According to the first preferred embodiment of the present invention described above, by controlling the schedule so that virtual channels in a relay device are allocated uniformly among multiple packets to be sent to mutually different destinations in an NoC, which often has only a limited number or size of virtual channels available, thereby using the virtual channels more efficiently and improving the overall transfer performance of the NoC.

On the other hand, the relay device of this second preferred embodiment turns the crossbar switch that connects the input and output ports on the basis of one flit, which is smaller in size than one packet, thereby attempting to use the virtual channels even more efficiently and further improve the overall transfer performance of the NoC.

Hereinafter, it will be described with reference to FIG. 22 generally how the relay device of this preferred embodiment works.

FIGS. 22A and 22B illustrate how when packets are going to be transmitted through three relay devices #1, #2 and #3 to four reception nodes A, B, C and D, those relay devices control the transmission schedule and in what order flits that pass through the respective buses need to be transmitted. Specifically, FIG. 22A illustrates a situation where the buses are used unevenly, while FIG. 22B illustrates a situation where the buses are used uniformly.

More specifically, FIG. 22A illustrates in what order the flits that are flowing through the respective buses need to be transmitted if each relay device turns the crossbar switch every time one packet is transmitted.

If the transmission schedule is controlled on a packet-by-packet basis, the same bus will be used continuously until all of the flits that form that packet are transmitted completely. That is why in such a situation, some buses will be congested with the flits flowing but the others will not (and will not be used at al) as shown in FIG. 22A. That is to say, the buses tend to be used unevenly in that case.

On the other hand, FIG. 22B illustrates in what order the flits that are flowing through the respective buses need to be transmitted if each relay device turns the crossbar switch every time one flit is transmitted.

If the transmission schedule is controlled on a flit-by-flit basis, then multiple packets to be sent to mutually different destinations can be transmitted simultaneously with the flits to send changed every cycle. As a result, the buses leading to multiple different destinations can be used with loads imposed on them more evenly and the overall buses can be used more efficiently.

FIG. 23 shows in comparison how the bus use efficiency and the crossbar switch turning frequency change depending on whether the packet transmission schedule is controlled on a packet basis or on a flit basis.

If the crossbar switch is turned as shown in FIG. 22B on a flit-by-flit basis, the crossbar switch should be turned more frequently than in a situation where the crossbar switch is turned on a packet-by-packet basis. As a result, the complexity of the processing to turn the crossbar switch increases. Nevertheless, since buses leading to multiple different destinations can be used at the same, the bus use efficiency in the entire NoC increases and the transfer performance can be improved.

Thus, by checking out the load imposed on virtual channels, the relay device of this preferred embodiment turns the crossbar switch every time a packet is transmitted in order to reduce the frequency to turn the switch and thereby save the power dissipation if there is a relatively light load on the virtual channels. On the other hand, if the load imposed is higher than a predetermined threshold value, the relay device of this preferred embodiment turns the crossbar switch every time one flit is transmitted because the bus transfer performance should be improved in that case.

Figure 24:
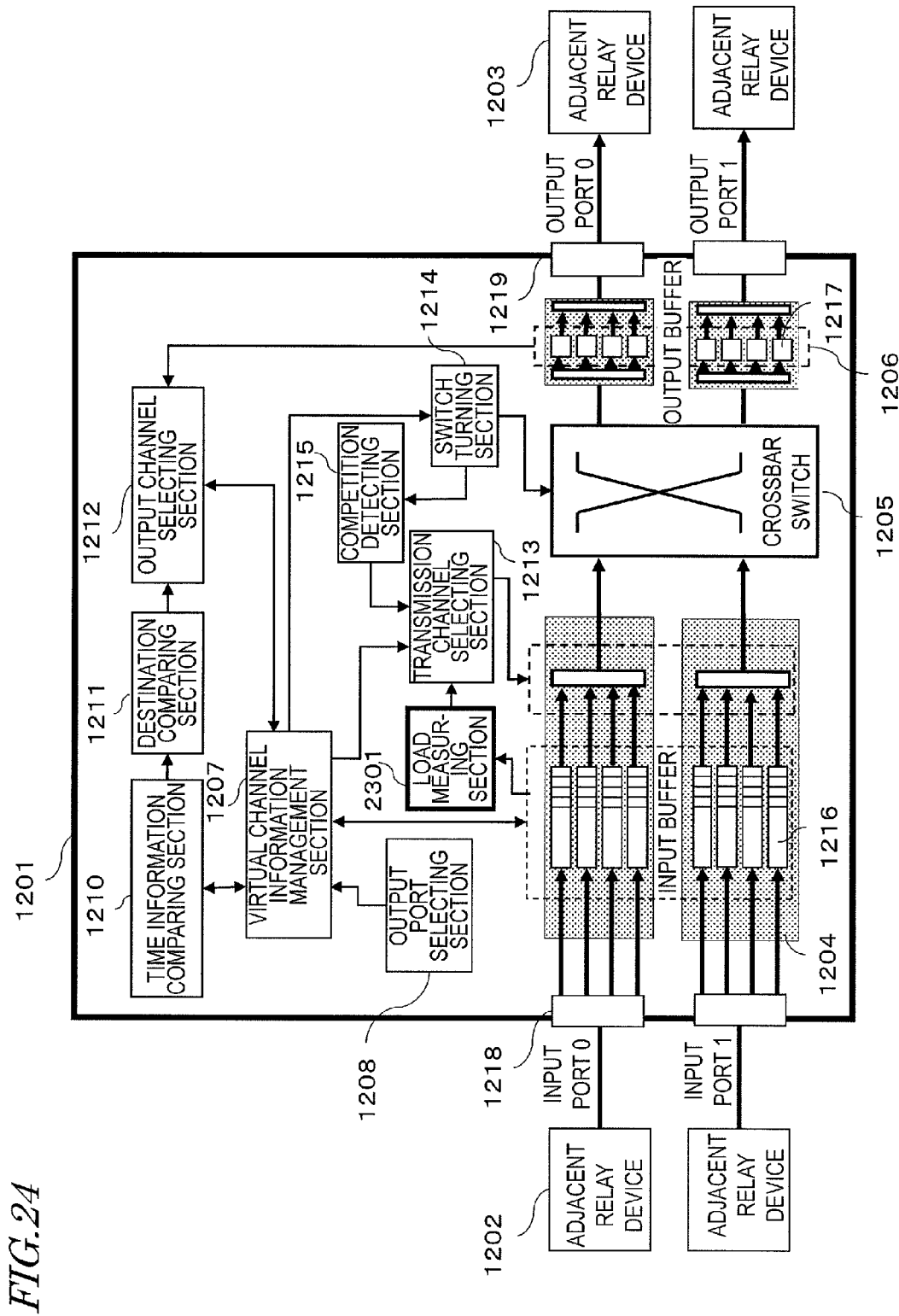
FIG. 24 illustrates a configuration for a relay device as a second preferred embodiment of the present invention.

FIG. 24 illustrates a configuration for a relay device as a second preferred embodiment of the present invention.

In FIG. 24, any component also included in the relay device of the first preferred embodiment shown in FIG. 8 and having substantially the same function as its counterpart is identified by the same reference numeral and description thereof will be omitted herein. It should be noted that the input section 120a and the output section 120b shown in FIG. 8 are not illustrated in FIG. 24 but could be defined in the same way even in the configuration shown in FIG. 24.

The load measuring section 2301 shown in FIG. 24 determines whether or not the transfer load on the input buffers 1204 is higher than a predetermined threshold value. The transfer load on the input buffers 1204 may be measured by counting the number of virtual channels currently used in the input buffers 1204 or the number of flits that are stored on the virtual channels 1216 or by calculating the flit stay time, for example. In this manner, the magnitude of the load can be measured quantitatively.

Figure 25:
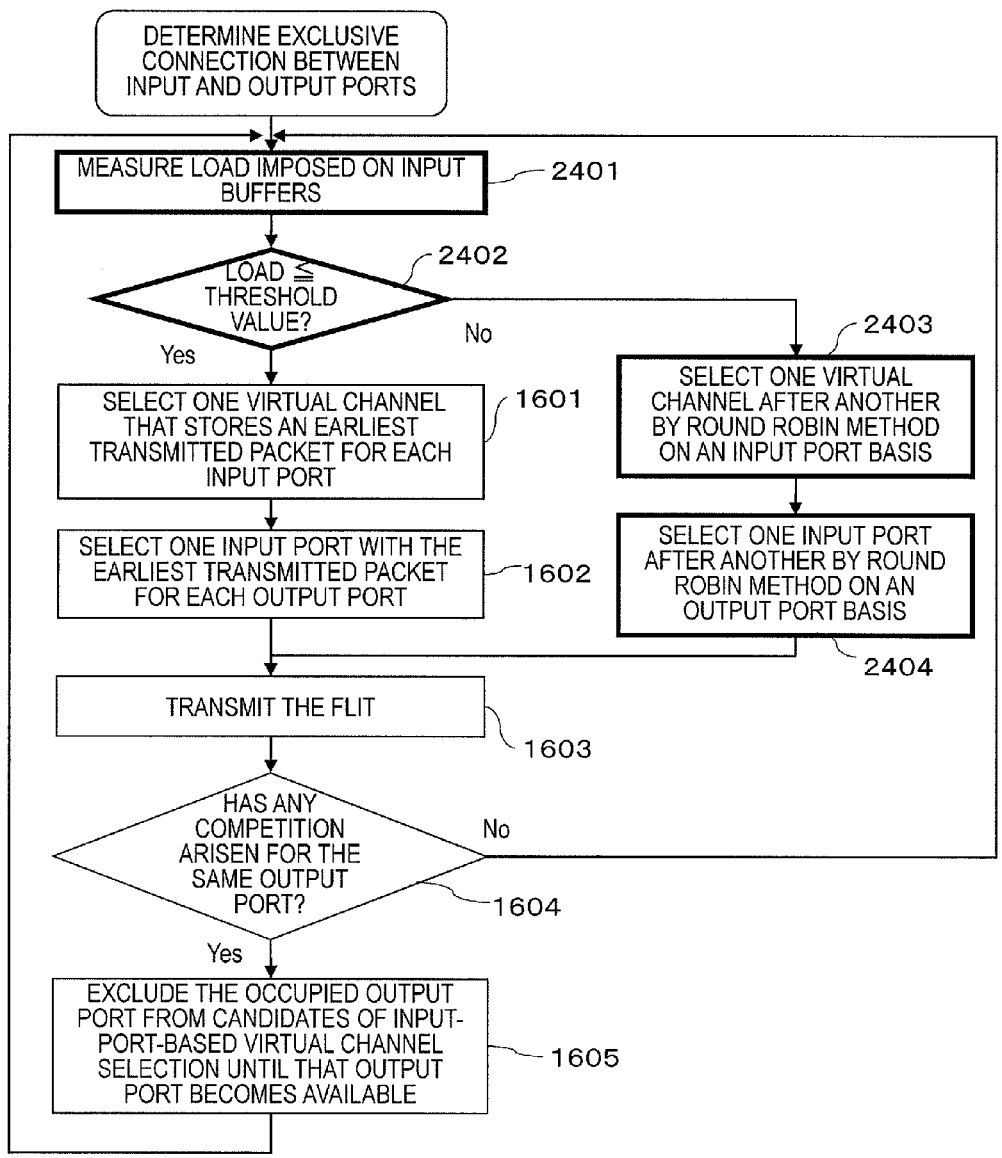
FIG. 25 is a flowchart showing how the relay device of the second preferred embodiment changes the connections between virtual channels and output ports.

FIG. 25 illustrates how the relay device of this second preferred embodiment changes the connections between virtual channels and output ports.

In FIG. 25, any processing step also included in the procedure of the first preferred embodiment shown in FIG. 19 and having substantially the same function as its counterpart is identified by the same reference numeral and description thereof will be omitted herein. The procedure shown in FIG. 25 includes four additional processing steps S2401 through S2404, which is a difference from the one shown in FIG. 19.

In Step 2401, the load measuring section 2301 measures the load imposed on the input buffers 1204. Next, in Step 2402, the load measuring section 2301 determines whether or not the load measured is equal to or smaller than a threshold value.

If the load is equal to or smaller than the threshold value, the process advances to Step 1601, in which a virtual channel that stores a packet that was transmitted earliest is selected. On the other hand, if the load is greater than the threshold value, then the process advances to Step 2403.

If the load is equal to or smaller than the threshold value, then the transmission channel selecting section 1213 selects in Step 2403 a virtual channel, to which an output channel has already been allocated, sequentially by the round robin method on an input port basis.

If some of the virtual channels that have been selected by the transmission channel selecting section 1213 attempt to use the same output port, then the switch turning section 1214 sequentially selects one virtual channel at a time by the round robin method in Step 2404.

Optionally, as long as a flit with a different destination can be transmitted every time the relay device transmits one flit, the processing steps 2403 and 2404 may be replaced with any other processing step (e.g., selecting virtual channels at random).

As described above, the relay device of this second preferred embodiment checks out the magnitude of the transfer load on the relay device, thereby automatically changing the modes of transmission so that the complexity of the processing to turn the switch becomes relatively low if the magnitude of the load is low and that a relatively high transfer performance is achieved if the magnitude of the load is high.

In the preferred embodiment described above, the virtual channels are supposed to be switched either on a packet-by-packet basis or on a flit-by-flit basis according to the magnitude of the load on the input buffers. However, the virtual channels may always be switched on a flit basis. That is to say, the relay device may interleave multiple packets with each other on a flit basis so as to apparently output multiple packets in parallel with each other. This is a particularly effective measure to take if there are multiple output buffers.

Embodiment 3

In the first preferred embodiment described above, an output channel is supposed to be allocated on a destination basis to a virtual channel that stores a packet that was transmitted the longest time ago.

On the other hand, according to this third preferred embodiment, output channels are allocated preferentially to packets that share the smallest number of relay devices on the transmission route leading to the destination with the packets to which an output channel has already been allocated, thereby cutting down the interference between the packets on the transmission route and improving the overall transfer performance of the NoC.

Figure 26:
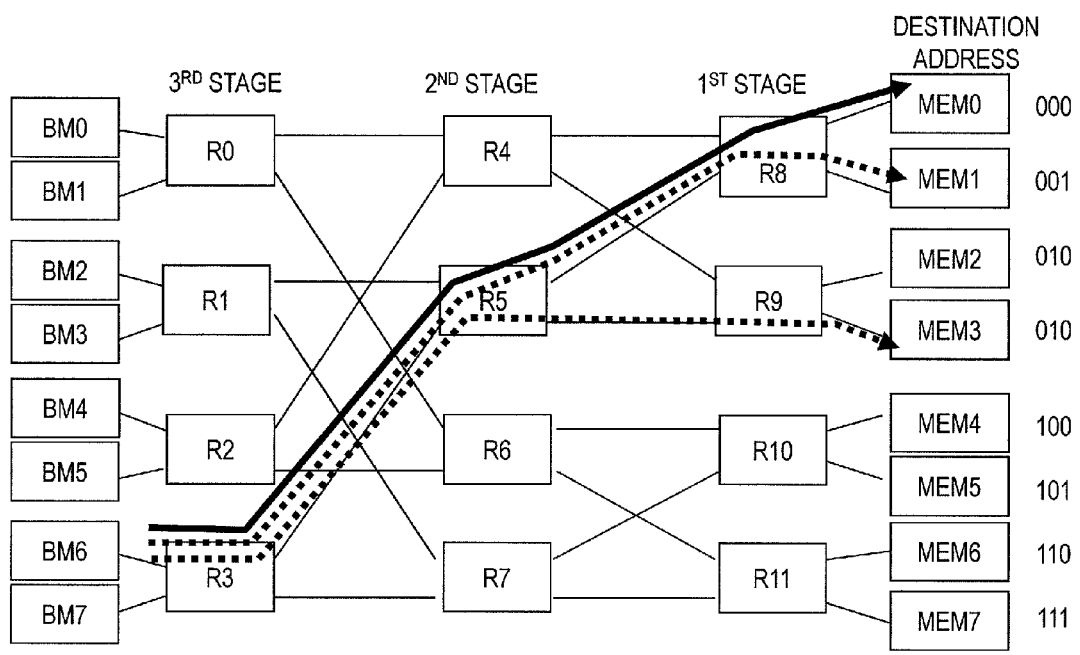
FIG. 26 illustrates how bus sharing occurs in an NoC with a multistage interconnection network topology in a third preferred embodiment of the present invention.

FIG. 26 illustrates generally how the relay device of this preferred embodiment works.

Suppose in the relay device R3 of a multistage interconnection network, packets to be sent to the memories #0, #1 and #3 are already stored on virtual channels, an output channel has already been specified to the virtual channel that stores the packet to be sent to the memory #0, and output channels are yet to be allocated to the virtual channels that store the packets to be sent to the memories #1 and #3.

With respect to the transmission route of the packet to be sent to the memory #0 to which an output channel has already been allocated, the packet to be sent to the memory #1 uses the same output port as the former packet at the relay device R5, too, but the packet to be sent to the memory #3 uses a different output port from that packet at the relay device R5.

That is why in order to minimize the competition for the same output port on the transmission route, the relay device of this third preferred embodiment allocates an output channel preferentially to not only a virtual channel that stores a packet that was transmitted the longest time ago but also a virtual channel that stores a packet that shares the smallest number of buses on the transmission route leading to the destination with the virtual channels to which an output channel has already been allocated.

Figure 27:
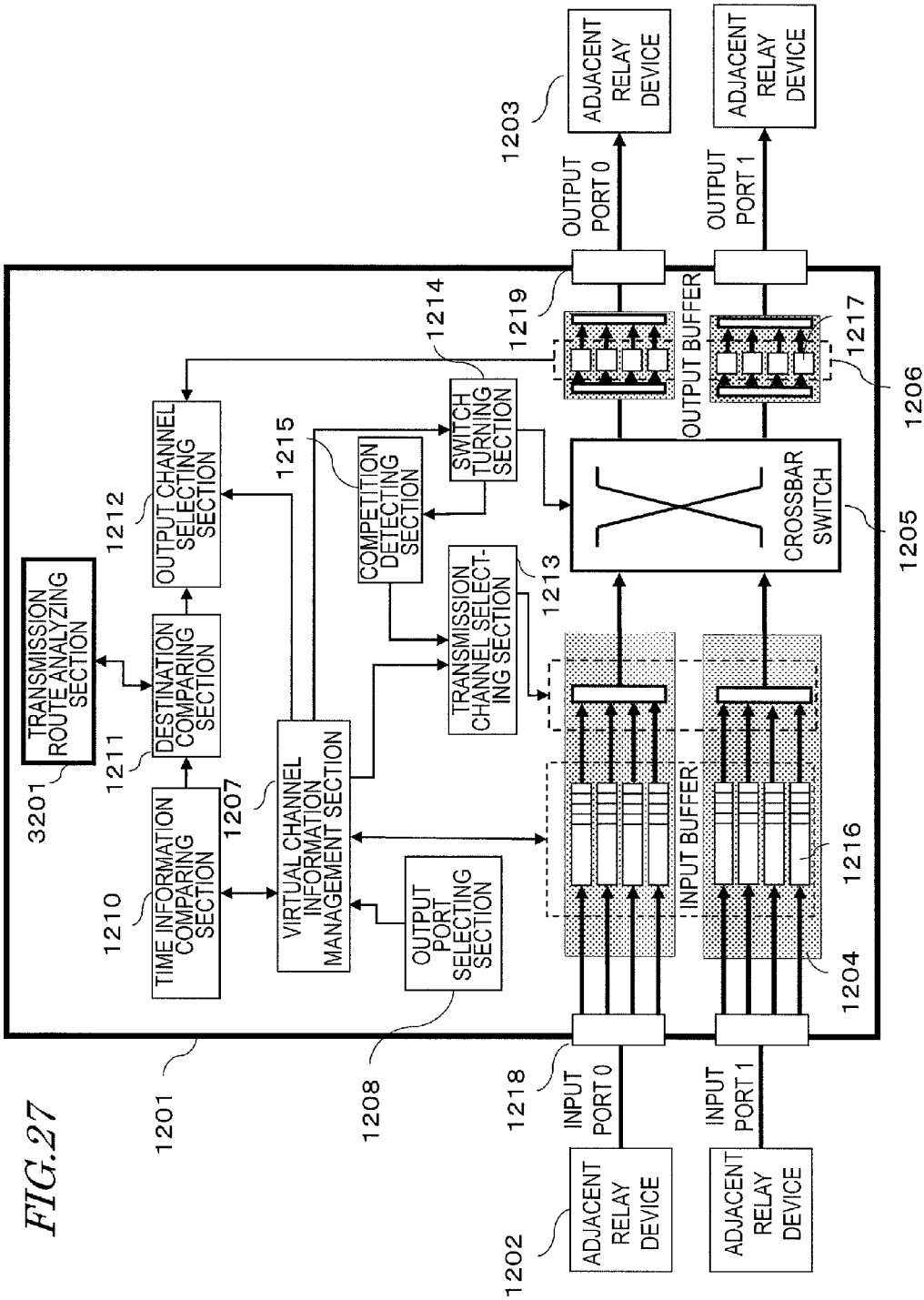
FIG. 27 illustrates a configuration for a relay device as a third preferred embodiment of the present invention.

FIG. 27 illustrates a configuration for a relay device as a third preferred embodiment of the present invention. On the other hand, FIG. 28 shows how the relay device of this preferred embodiment carries out its processing.

Figure 28:
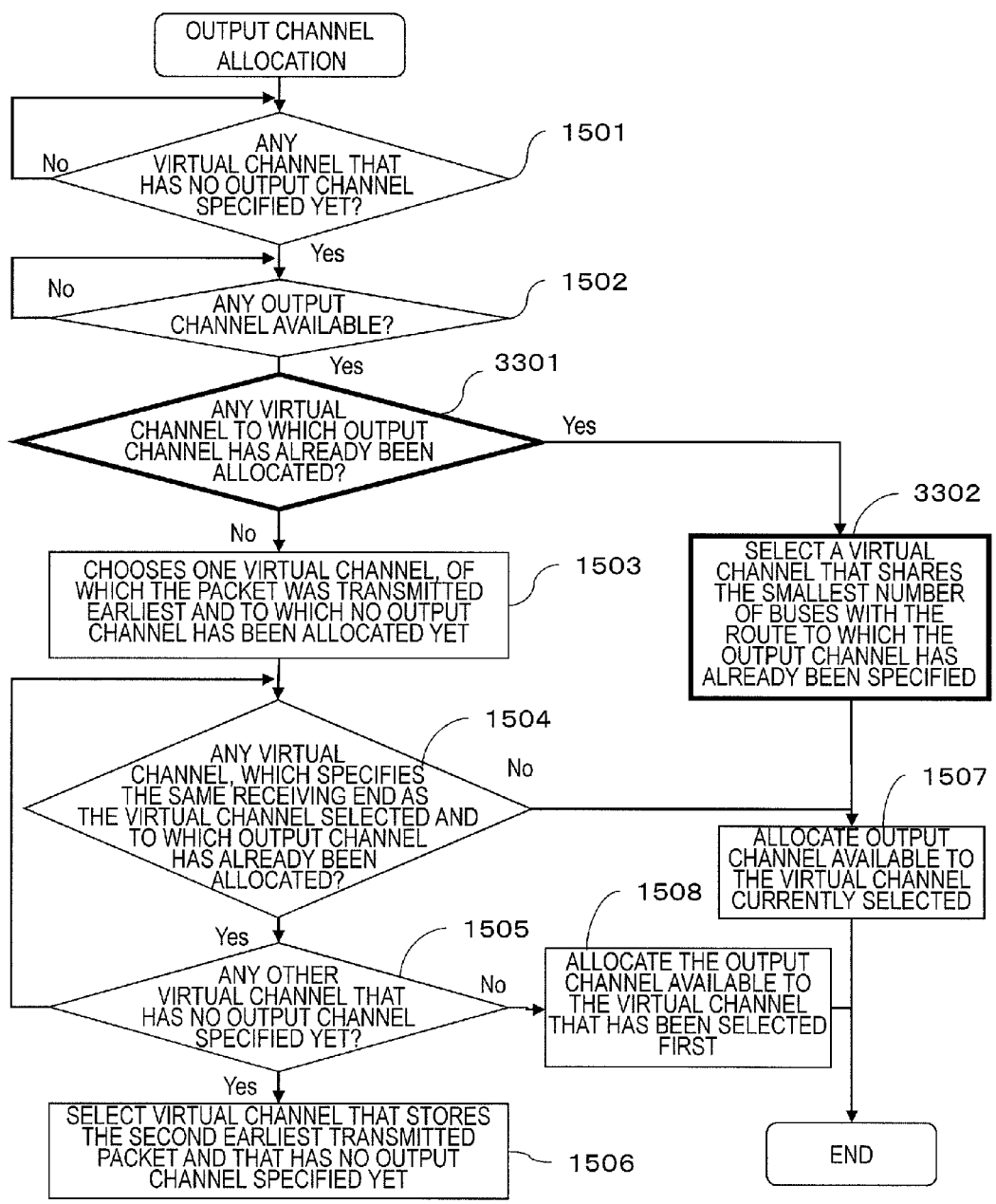
FIG. 28 is a flowchart showing how the relay device of the third preferred embodiment carries out its processing.

In FIGS. 27 and 28, any component or processing step also used in the first preferred embodiment shown in FIG. 8 or and having substantially the same function as its counterpart is identified by the same reference numeral and description thereof will be omitted herein. It should be noted that the input section 120a and the output section 120b shown in FIG. 8 are not illustrated in FIG. 27 but could be defined in the same way even in the configuration shown in FIG. 27.

In Step 3301 shown in FIG. 28, the transmission route analyzing section 3201 determines whether or not there is any virtual channel to which an output channel has already been allocated. If the answer is YES, the process advances to Step 3302. Otherwise, the process advances to Step 1503. In Step 3302, the transmission route analyzing section 3201 counts the number of buses shared by multiple packets, each of which is on the transmission route leading from a relay device to its reception node as the destination, and selects a virtual channel that shares the smallest number of buses with the route to which the output channel has already been specified.

For example, in the NoC with the multistage interconnection network topology shown in FIG. 26, the addresses of the destinations, which are represented as binary numbers, are compared to each other from the left to the right on a digit-by-digit basis, and if there is any digit that has a value shared by multiple addresses, then the number of such digits becomes the number of buses shared. Specifically, in FIG. 26, the addresses "000" and "001" of the memories #0 and #1 have most and second most significant digits with the same value, and therefore, it can be determined that their transmission routes share buses at two points. On the other hand, the addresses "000" and "011" of the memories #0 and #3 have the most significant digit with the same value, and therefore, it can be determined that their transmission routes share buses at one point.

FIG. 28 shows exactly how the relay device of this third preferred embodiment allocates output channels. In FIG. 28, any processing step also included in the procedure of the first preferred embodiment shown in FIG. 15 and having substantially the same function as its counterpart is identified by the same reference numeral and description thereof will be omitted herein.

In Step 3301, the transmission route analyzing section 3201 determines whether or not there is any virtual channel to which an output channel has already been allocated. If the answer is NO, the process advances to Step 1503. On the other hand, if the answer is YES, the process advances to Step 3302.

In the example illustrated in FIG. 26, an output channel has already been allocated to a virtual channel of the relay device R3 that stores a packet to be sent to the memory #0. Thus, the process advances to Step 3302.

Next, in Step 3302, the transmission route analyzing section 3201 finds a destination that shares the smallest number of buses with the transmission route leading to the destination to which an output channel has already been allocated, and selects a virtual channel that stores a packet to be sent to the former destination as a candidate to which an output channel is allocated. After that, the process advances to Step 1507.

Specifically, in the example illustrated in FIG. 26, the relay device R3 determines which of the two routes leading to the memories #1 and #3, respectively, shares the smaller number of buses with the route leading to the memory #0 to which an output channel has already been allocated.

In the example illustrated in FIG. 26, the two routes leading to the memories #0 and #1, respectively, share the buses twice, while the two routes leading to the memories #0 and #3 share the same bus only once. Thus, the relay device R3 selects a virtual channel that stores a packet to be sent to the memory #3 as a candidate to which an output channel is allocated.

As described above, by adopting the configuration shown in FIG. 27 and by performing the processing shown in FIG. 28, the relay device of this third preferred embodiment allocates an output channel preferentially to a packet that shares the smallest number of buses on the transmission route leading to the destination with the packet to which an output channel has already been allocated. As a result, the competition for the same output port can be minimized on the transmission route, and the transfer performance can be improved.

Optionally, the transmission route analyzing section 3201 may analyze the bus sharing in real time. However, the route leading from each relay device to any memory can already be specified during the design process. That is why the number of routes shared may be determined in advance and that information may be stored in the form of a table in the transmission route analyzing section 3201 in advance. In that case, the transmission route analyzing section 3201 may determine the degree of route sharing by reference to that table.

Preferred embodiments of the present invention are just as described above.

In the first through third preferred embodiments of the present invention described above, each output buffer 1206 of each relay device is supposed to have multiple output channels 1217, and the output channel selecting section 1212 is supposed to allocate an output channel 1217 to a packet that is stored in any virtual channel 1216.

As already described about the configuration shown in FIG. 8, the number of the output channels 1217 provided for each output buffer 1206 is the same as that of virtual channels provided for its associated relay device 1203, which is connected to the output buffer 1206 through its associated output port 1219. Thus, there is one-to-one correspondence between the output channels 1217 of each output buffer 1206 and the virtual channels of its associated relay device 1203. That is why the selection of an output channel 1217 by the output channel selecting section 121 is synonymous with an indirect selection of a virtual channel at the input port of a relay device 1203 on the receiving end.

It can be seen that if this idea is further expanded, the relay device of the first, second or third preferred embodiment described above may also be designed so that the output channel selecting section 1212 directly selects a virtual channel of the relay device 1203 on the receiving end in order to eliminate the output channels 1217 and output buffers 1206. In that case, the output channel selecting section 1212 may perform the processing steps of: (1) getting information about the statuses of virtual channels from a relay device 1203 on the receiving end to check out the availability of virtual channels at the relay device 1203 on the receiving end; (2) allocating a virtual channel to store a packet in the relay device 1203 on the receiving end to each packet that is stored on one of its own virtual channel 1216; and (3) when transmitting a flit from a virtual channel, instructing the relay device 1203 what virtual channel needs to store the flit. With such a configuration that uses no output channels 1217 or output buffers 1206, the number of buffers to provide in the relay device 1201 can be reduced, and therefore, the chip area to use could be cut down and the controller could be simplified.

Figure 29:
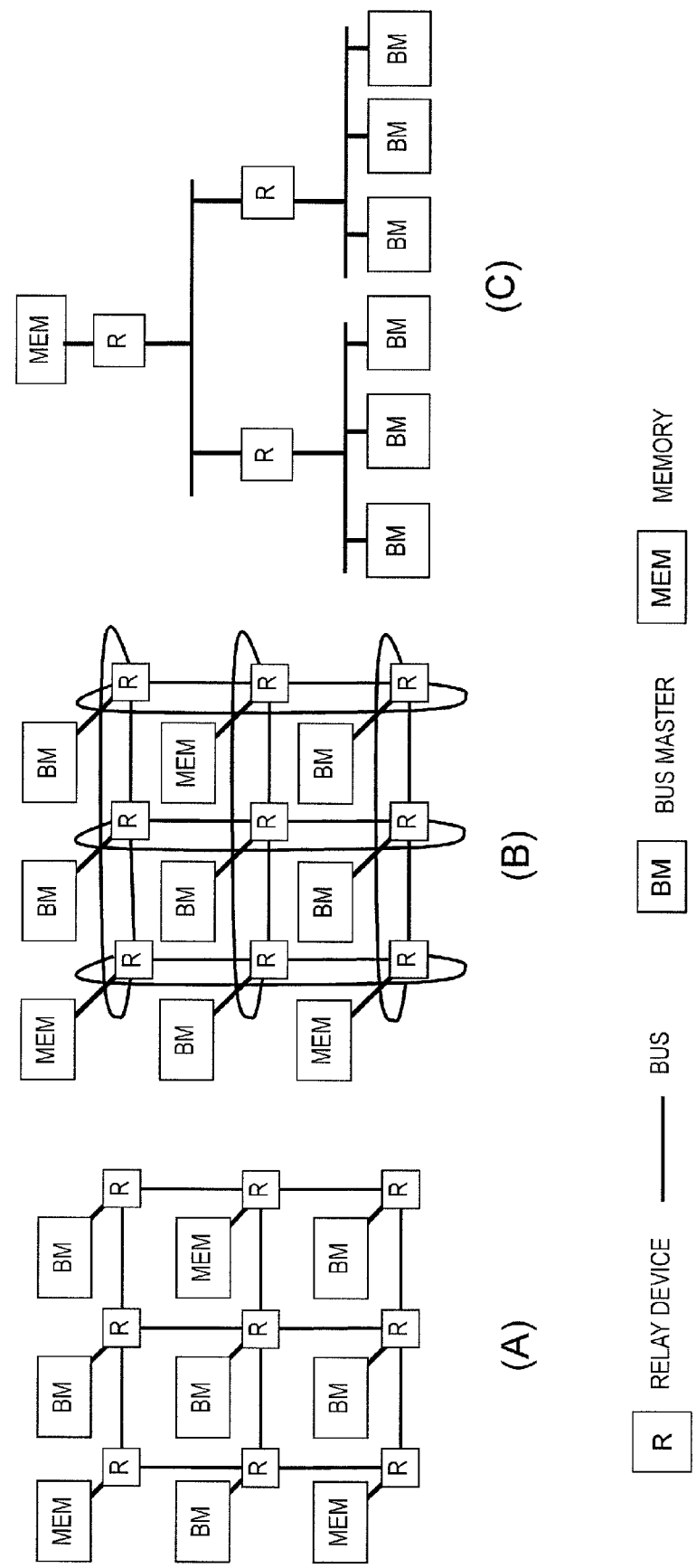
FIGS. 29(A) through 29(C) illustrate examples of integrated circuit topologies.

Also, in the first to third preferred embodiments of the present invention described above, the topology of the integrated circuit is supposed to be the multistage interconnection network. However, the relay device of the present invention does not always have to be used in such a multistage interconnection network. Alternatively, a mesh-type topology may also be formed by arranging multiple relay devices as a grid as shown in FIG. 29(A). Still alternatively, a torus-type topology, in which relay devices are connected both vertically and horizontally to form a ring shape, may also be adopted as shown in FIG. 29(B). Furthermore, a hierarchical topology, in which buses are connected together hierarchically, may even be adopted as shown in FIG. 29(C). Anyway, the relay device of the present invention is applicable in the same way to any topology in which a number of bus masters are connected together through distributed buses.

Figure 30:
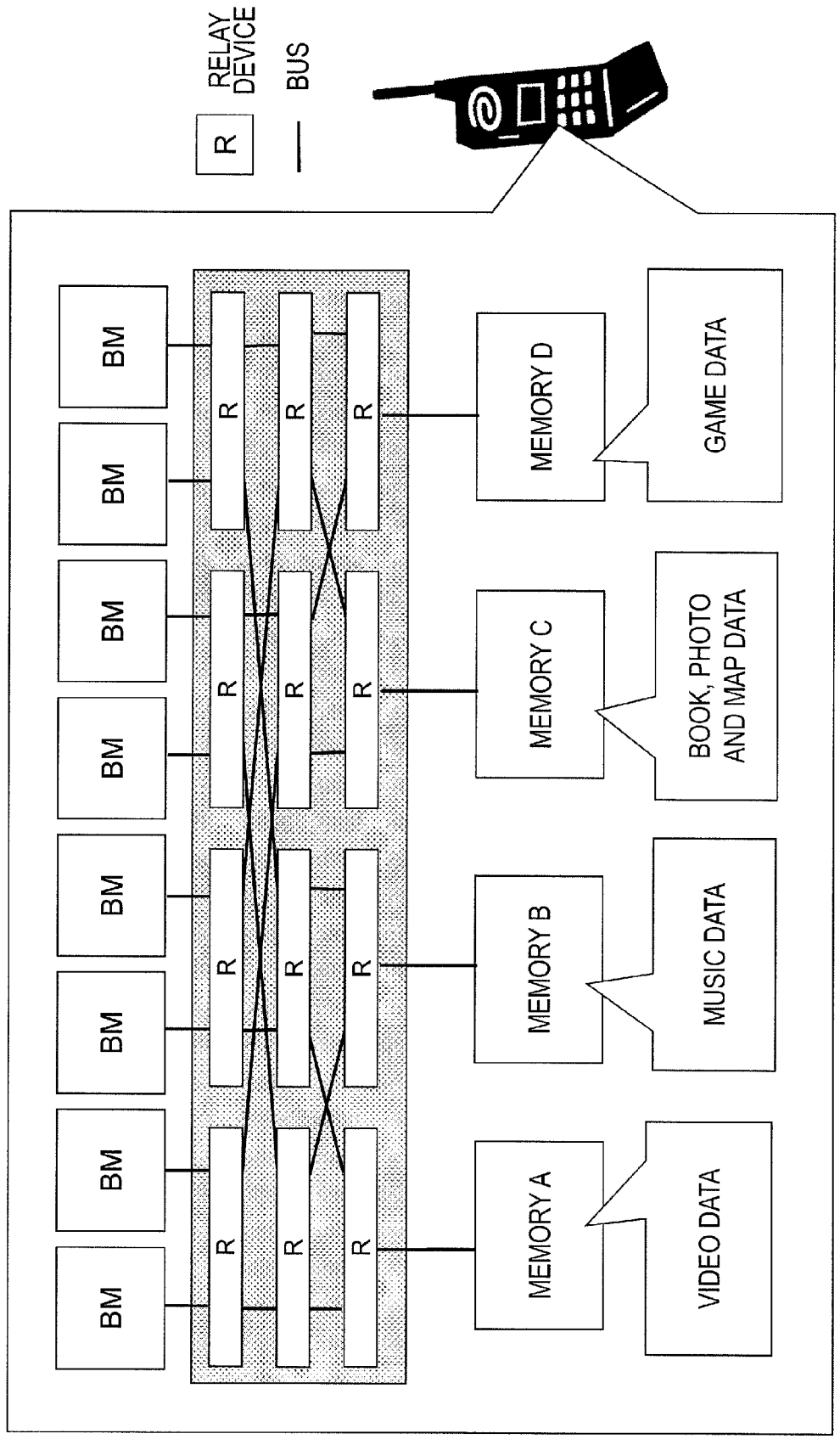
FIG. 30 illustrates an example in which the relay device of the present invention is applied to a memory bus.

FIG. 30 illustrates an example in which the relay device of the present invention is applied to a memory bus.

In the exemplary application illustrated in FIG. 30, bus masters (including CPUs, DSPs, transmission processing sections and image processing sections) on a semiconductor integrated circuit for use in portable electronic devices such as cellphones, PDAs (personal digital assistants) and electronic book readers, TVs, video recorders, camcorders and surveillance cameras are connected to multiple memories through distributed buses.

When multiple applications or services are used in parallel with each other (e.g., when multiple different video clips or musical tunes are reproduced, recorded or transcoded, or when book, photograph or map data is viewed or edited, or when a game is played), respective bus masters will access memories more frequently. If there was only one memory to be accessed by the respective bus masters, then those accesses would be overconcentrated at one point. To reduce such an overconcentration of accesses, however, the input and output transmission ranges should be broadened on the memory side, which would increase the cost.

One way for avoiding such an overconcentrated memory accesses, the memories to be used by bus masters may be physically classified according to the type of the application or the service, and those bus masters and memories may be connected together with distributed buses.

However, in the example illustrated in FIG. 30, if a bus master has transmitted a data packet to memory A at a high rate in order to save video data there and if the respective relay devices just relay data packets received with the order of reception maintained, then every virtual channel on the transmission route will be occupied with the packet to be sent to the memory A frequently. In that case, data will not flow to the other memories smoothly and the performances of the other applications or services will decline and the processing time will increase.

If the relay device of the present invention is used, however, virtual channels of each relay device can be allocated uniformly to packets to be sent to multiple different destinations. As a result, the relay device of the present invention can prevent packets to be sent to a particular memory from occupying the virtual channels, thus contributing to improving the performances of all applications and services on a semiconductor integrated circuit and shortening the processing time.

It should be noted that the memories described above may be either volatile DRAMs or nonvolatile flash memories. Or the memories may be a combination of volatile and nonvolatile memories.

Figure 31:
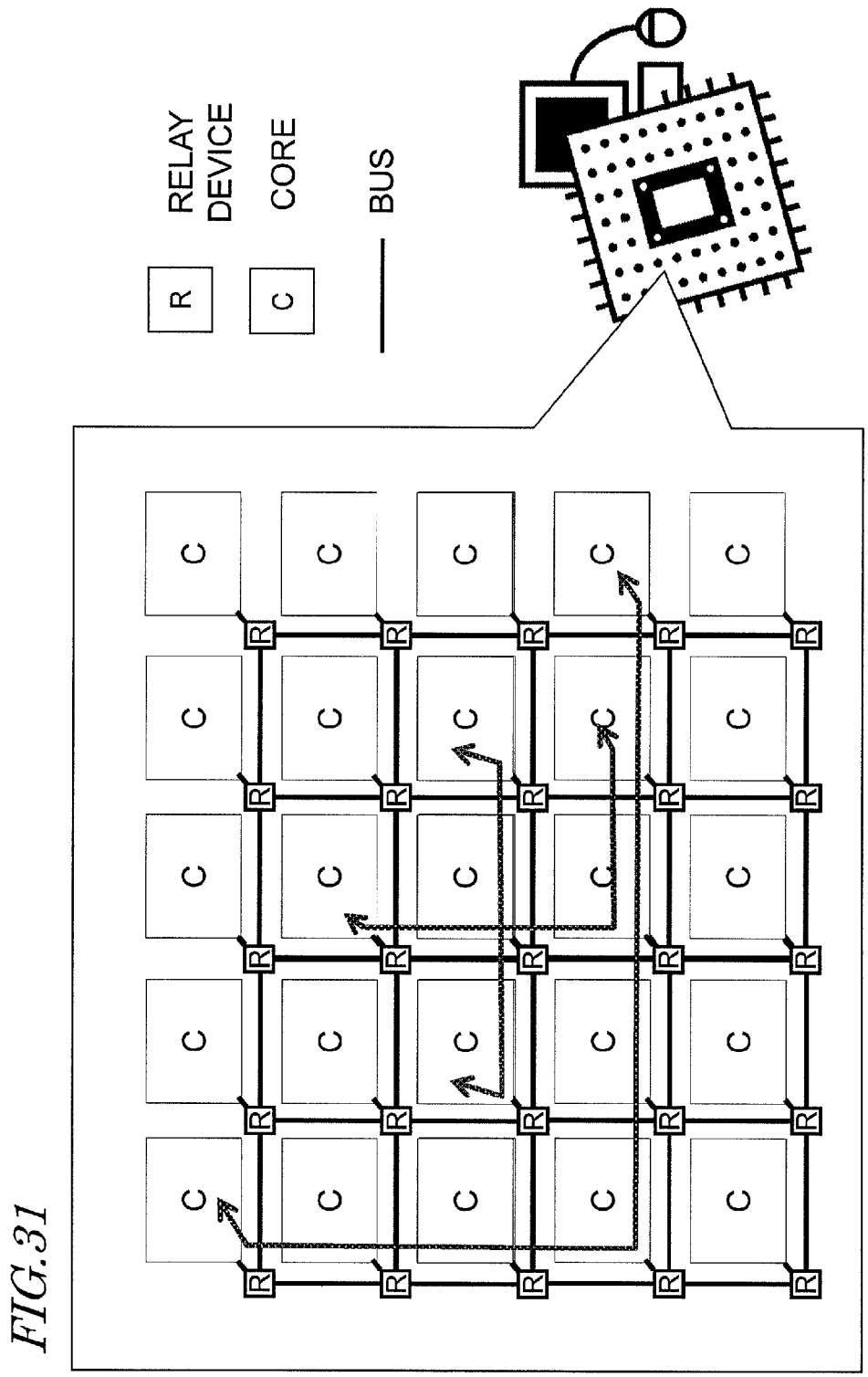
FIG. 31 illustrates an example in which the relay device of the present invention is used on a multi-core processor.

FIG. 31 illustrates an example in which the relay device of the present invention is used on a multi-core processor. The cores in the multi-core processor may be a CPU, a GPU, a DSP and so on.

In the multi-core processor shown in FIG. 31, a number of core processors such as a CPU, a GPU and a DSP are arranged in a mesh pattern and connected together with distributed buses in order to improve the processing performance of those core processors.

On this multi-core processor, communications are carried out between the respective core processors. For example, each core processor has a cache memory to store required data to get computational processing done. And information stored in the respective cache memories can be exchanged and shared with each other between those core processors. As a result, their performance can be improved.

However, the communications are carried out between those core processors on such a multi-core processor at respectively different locations, over mutually different distances (which are represented by the number of relay devices to hop), and with varying frequencies communication. That is why if data packets transmitted are just relayed with their order of reception maintained, then some relay devices will have all of their virtual channels occupied with packets to be sent to particular core processors and will not let the data flow smoothly. As a result, the performance of the multi-core processor will decline and its processing time will increase.

If the relay device of the present invention is used, however, virtual channels of each relay device can be allocated uniformly to packets to be sent to multiple different destinations. As a result, the relay device of the present invention can prevent packets to be sent to a particular core processor from occupying the virtual channels, thus contributing to improving the performances of those core processors and shortening the processing time.

The relay device of the present invention can arrange the virtual channel allocation schedule efficiently for the respective packets transmitted through each relay device in an integrated circuit with distributed buses, thus contributing to improving the overall transfer performance of an NoC in terms of throughput, propagation delay and jitter. With this relay device, there is no need to increase the number of virtual channels that will impose a lot of constraints on the circuit design process. That is why when a DSP for processing multiple media and a CPU for transferring files at high rates are integrated together on a single SoC (system on chip) with distributed buses, the present invention contributes effectively to getting the circuit design process done with a lot of resources saved and with the processing time delay cut down.

On top of that, since a lot of resources can be saved and the processing time delay can be reduced, the present invention also contributes to cutting down the power dissipation of the entire integrated circuit.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A relay device comprising:
    an input buffer for receiving data units, each of which includes a header, to which multiple pieces of destination information have been added, and data associated with the header;
    multiple virtual channels for storing data units, each of the multiple virtual channels storing a data unit in accordance with the destination information;
    a destination comparing section for determining the order of allocation of virtual channels at a relay device on the receiving end with respect to the data units that are stored on the multiple virtual channels by seeing if their destinations are the same; and
    an output section for outputting the stored data units preferentially through one of the virtual channels that has already allocated at the relay device on the receiving end.

2. The relay device of claim 1, wherein the destination comparing section sorts the data units by the destination and determines the order of allocation so that if any data is going to be sent to a destination to which no virtual channel has been allocated yet at the relay device on the receiving end, some virtual channel is allocated to that data preferentially at the relay device on the receiving end.

3. The relay device of claim 2, wherein if multiple data units are going to be sent to the same destination, the destination comparing section determines the order of allocation of the virtual channels to those data units at the relay device on the receiving end by reference to time information included in the header.

4. The relay device of claim 3, wherein by using, as the time information, the amount of time that has passed since data was transmitted, the destination comparing section allocates one of the virtual channels at the relay device on the receiving end preferentially to data that was transmitted the longest time ago.

5. The relay device of claim 3, wherein by using, as the time information, a deadline by which data should arrive at its destination, the destination comparing section allocates one of the virtual channels at the relay device on the receiving end preferentially to data that has the shortest time left until its deadline.

6. The relay device of claim 1, further comprising multiple input ports, each of which receives data to be sent to a specified destination,
    wherein the output section includes:
    multiple output ports, each of which outputs data; and
    a crossbar switch for outputting the data through the output ports according to the destinations of the data that are stored on the virtual channels by connecting one of the virtual channels that stores data, of which the time-information-based priority is higher than any other data, to one of the output ports that is connected to a bus leading to the destination of that data with the highest priority.

7. The relay device of claim 6, wherein the longer the amount of time that passed since data stored on the virtual channel was transmitted, the higher its time-information-based priority.

8. The relay device of claim 6, wherein the shorter the amount of time left until a deadline, by which data stored on the virtual channel should arrive at its destination, the higher its time-information-based priority.

9. The relay device of claim 6, wherein each packet of the data is comprised of a number of flits and the data is transferred on a flit basis over the bus, and
    wherein the relay device further includes a load measuring section for measuring the load of data that passes through the relay device itself, and
    wherein if the load that has been measured by the load measuring section is greater than a predetermined threshold value, the crossbar switch changes connections between the virtual channels and the output ports every time one flit is transmitted, but
    if the load is equal to or smaller than the threshold value, the crossbar switch changes connections between the virtual channels and the output ports every time a number of flits that form one packet are transmitted.

10. The relay device of claim 9, wherein the load measuring section measures the number of flits that are stored on the virtual channels in its relay device as the load of the data that passes through the relay device.

11. The relay device of claim 9, wherein every time one flit is transmitted, the crossbar switch changes connections between the virtual channels and the output ports.

12. The relay device of claim 1, further comprising:
    a transmission route analyzing section for finding transmission routes, respective parts of which are shared by multiple packets to be sent to mutually different destinations; and
    an output channel selecting section for selecting, by reference to the time information and on a virtual channel's destination basis, an output channel to be connected to the virtual channel that stores the data with the highest time-information-based priority,
    wherein by adopting the transmission routes that have been found by the transmission route analyzing section, the output channel selecting section allocates the virtual channels at the relay devices on the receiving end sequentially so that one of the relay devices that stores a packet that will arrive at its destination with the transmission route sharing minimized is given the virtual channel earlier than any other relay device.

13. The relay device of claim 1, wherein the destination comparing section determines the order of allocation of the virtual channels at the relay devices on the receiving end to the data units that are stored on the multiple virtual channels by seeing if the same relay device is to pass on the routes leading to the destinations.

14. A relay device comprising
    multiple virtual channels for storing data units, each of which includes a header, to which deadline information indicating a deadline by which data should arrive at its specified destination has been added, and data associated with the header, and
    a destination comparing section for determining the order of allocation of virtual channels at a relay device on the receiving end with respect to the data units that are stored on the multiple virtual channels by reference to the time specified by the time information,
wherein once one of the virtual channels at the relay device on the receiving end has been allocated, the virtual channel begins to output the data unit stored and get that data unit relayed through an integrated circuit.

* * * * *